United States Patent [19]

Tsukerman

[11] Patent Number: 6,041,423
[45] Date of Patent: *Mar. 21, 2000

[54] METHOD AND APPARATUS FOR USING UNDO/REDO LOGGING TO PERFORM ASYNCHRONOUS UPDATES OF PARITY AND DATA PAGES IN A REDUNDANT ARRAY DATA STORAGE ENVIRONMENT

[75] Inventor: Alex Tsukerman, Foster City, Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/747,064

[22] Filed: Nov. 8, 1996

[51] Int. Cl.⁷ ........................................ G06F 11/00
[52] U.S. Cl. ................................. 714/19; 711/114
[58] Field of Search .................. 395/181, 182.03, 395/182.04, 182.06, 182.13, 182.14, 182.17, 182.18, 182.19, 427, 441, 428, 182.05, 182.1, 183.18; 371/40.15, 10.3, 51.1; 711/114; 714/19, 1, 5, 20, 42

[56] References Cited

U.S. PATENT DOCUMENTS

| | | |
|---|---|---|
| 4,761,785 | 8/1988 | Clark et al. . |
| 5,208,813 | 5/1993 | Stallmo ............................ 395/182.04 |
| 5,341,831 | 8/1994 | Fuller ..................................... 371/10.1 |
| 5,390,327 | 2/1995 | Lubbers et al. ......................... 395/575 |
| 5,448,578 | 9/1995 | Kim ........................................ 371/40.4 |
| 5,469,453 | 11/1995 | Gilder et al. ........................... 371/68.1 |
| 5,488,731 | 1/1996 | Mendelsohn ........................ 395/182.04 |
| 5,490,248 | 2/1996 | Dan et al. ............................ 395/182.04 |
| 5,497,457 | 3/1996 | Ford .................................... 395/182.04 |
| 5,524,205 | 6/1996 | Lomet et al. ....................... 395/182.14 |
| 5,537,567 | 7/1996 | Galbraith et al. ....................... 395/441 |
| 5,546,558 | 8/1996 | Jacobson et al. ....................... 395/441 |
| 5,574,882 | 11/1996 | Menon et al. ........................... 395/441 |
| 5,720,025 | 2/1998 | Wilkes et al. ...................... 395/182.04 |

*Primary Examiner*—Robert W. Beausoliel, Jr.
*Assistant Examiner*—Nadeem Iqbal
*Attorney, Agent, or Firm*—Blakely, Sokoloff, Taylor & Zafman LLP

[57] ABSTRACT

A method and apparatus for using undo/redo logging to perform asynchronous updates of parity and data pages in a redundant array data storage system is disclosed. The computer-implemented apparatus includes, 1) a redundant array data storage system having a plurality of data pages and a corresponding parity page residing therein, each page of the plurality of data pages and the parity page containing version information indicating a version of content in the page, 2) a memory-resident plurality of data pages corresponding to the plurality of data pages residing in the redundant array data storage system, 3) a data log retaining modification information defining any differences between content of the memory-resident plurality of data pages and content of the plurality of data pages residing in the redundant array data storage system, and 4) control logic for deferring modification of the parity page following modification of one of the plurality of data pages. The control logic further includes control logic for re-creating content of one of the plurality of data pages or the parity page by applying the modification information in the data log to the memory-resident plurality of data pages.

24 Claims, 23 Drawing Sheets

METHOD AND APPARATUS FOR USING UNDO/REDO LOGGING TO PERFORM ASYNCHRONOUS UPDATES OF PARITY AND DATA PAGES IN A REDUNDANT ARRAY DATA STORAGE ENVIRONMENT

FIELD OF THE INVENTION

The present invention relates to the field of data storage systems. Particularly, the present invention relates generally to the field of recovery from data corruption in a redundant array data storage system.

DESCRIPTION OF RELATED ART

Computer systems, particularly database systems, are vulnerable to possible loss of data from system failures or interface failures during the transfer of data between a computer and a data storage unit. Computer systems using a redundant array data storage system can be particularly susceptible to the loss of data because of the high volume of data transfers and the number of devices that may be involved in a single data transfer. Redundant array data storage systems are sets of data storage devices such as disc drives, for example which are used for the reliable and efficient storage of data. Many variations of redundant array data storage systems exist in the prior art. For example, U.S. Pat. No. 5,208,813, invented by Stallmo, entitled "On-line Reconstruction of a Failed Redundant Array System" describes a number of different approaches to providing reliable data storage using arrays of redundant, inexpensive disk drivers.

Five different architectures are described under the acronym "RAID" (Redundant Arrays of Inexpensive Disks). Raid 1 systems provide a mirrored storage unit for each primary storage unit that keeps a duplicate copy of all data on the primary unit. In Raid 2 systems, each bit of each word of data, plus error detection and correction (EDC) bits for each word are stored on a separate storage unit (this technique is known as bit striping). Other Raid systems improve performance by parceling data among the data storage units in various sizes, including blocks of data typically the size of a disk sector. Parceling data out in such blocks is also referred to as block striping. For each stripe of data, a parity block is stored on a single extra data storage unit designated as the parity unit. Thus, in a typical Raid implementation, data is striped across a number of data storage devices with one data storage device containing a block of parity information corresponding to the parity computed from the corresponding data blocks on the other data storage devices. If an entire data storage unit fails in a conventional Raid system, a replacement data storage unit can be substituted and any lost data can be reconstructed, stripe by stripe from the other operable data storage units in combination with the parity unit.

One limitation of these Raid systems is that every time data is written to any of the independently operating data storage units, new parity information must also be written to the parity unit. The parity information stored on the parity unit must be read and XORed with the old data (to remove the information content of the old data in the parity data), and the resulting sum must be XORed with the new data (to calculate the new parity information). The new data and the new parity information must then be written to the respective data storage unit and the parity unit. Using this method, a read and a write operation occurs at the parity unit each time a data block is changed on any of the data storage units. Thus, the parity unit becomes a potential bottleneck in a conventional Raid system.

Other conventional Raid systems, such as Raid 5 systems, distribute the parity information among all the data storage units in the system. In this manner, the parity information is not all stored on the same data storage device. However, at least two data storage devices must still be accessed each time a data record is modified. The first data storage device is accessed to modify the data record, and a second data storage device is accessed to modify corresponding parity information. Therefore, Raid systems can introduce a high level of overhead into a data storage system.

Outside of a redundant array data storage system context, other methods exist in conventional database technology for increasing the reliability of data transfers between a computer system and a data storage system and for reconstructing a database in the event of a failure. Many approaches for recovering database systems involve the use of logs. Logs are merely lists of time ordered actions which indicate, at least in the case of database systems, the nature of changes made to the database and the order in which those changes were made. Logs allow a computer system to place the data into a known and desired state which can then be used to redo or undo changes.

One such method for using logs is described in U.S. Pat. No. 5,524,205, titled "Methods and Apparatus for Optimizing Undo Log Usage", assigned to Oracle Corporation of Redwood Shores, Calif. This patent describes a data processing system including a plurality of nodes and a non-volatile storage medium divided into sections, the plurality of nodes making changes to the sections by way of transactions. Each transaction comprises a series of changes made to at least one section by at least one node. Each transaction is committed if a record of the changes effected by that transaction as well as an indication of the completion of that transaction are reliably stored on the storage medium. Otherwise, the transaction is uncommitted. A redo log describes the nature of a transaction and provides enough information for the transaction to be redone. That is, the transaction can be repeated. An undo log describes the nature of a transaction and provides enough information for the transaction to be undone. That is, the effect of the transaction is removed. In log-based data systems, a corrupted data record can be recreated by obtaining a previously saved old copy of the data record and then applying logged actions to the old data record to recreate the record to its new current state.

Although logging has been employed in conventional data storage systems, it has not been used in redundant array data storage systems, because typical redundant array data storage systems were thought to provide an acceptable level of reliability without the use of logging. However, other advantages for using logging with redundant array data storage systems have not been recognized in the prior art.

Thus, a method and apparatus for using undo/redo logging to perform asynchronous updates of parity and data pages in a redundant array data storage system is needed.

SUMMARY OF THE INVENTION

The present invention is a method and apparatus for using undo/redo logging to perform asynchronous updates of parity and data pages in a redundant array data storage system. The computer-implemented apparatus includes, 1) a redundant array data storage system having a plurality of data pages and a corresponding parity page residing therein, each page of the plurality of data pages and the parity page containing version information indicating a version of content in the page, 2) a memory-resident plurality of data pages corresponding to the plurality of data pages residing in the redundant array data storage system, 3) a data log retaining modification information defining any differences between content of the memory-resident plurality of data pages and content of the plurality of data pages residing in the redundant array data storage system, and 4) control logic for deferring modification of the parity page following modification of one of the plurality of data pages. The control logic further includes control logic for re-creating content of one of the plurality of data pages or the parity page by applying the modification information in the data log to the memory-resident plurality of data pages.

The present invention includes a method implemented in a computer-implemented apparatus having a redundant array data storage system having a plurality of data pages and a corresponding parity page residing therein, the computer-implemented apparatus further including a memory-resident plurality of data pages corresponding to the plurality of data pages residing in the redundant array data storage system, the method for updating pages in the redundant array data storage system, the method including the steps of: 1) applying version information to each page of the plurality of data pages and the parity page, the version information indicating a version of content in the page, 2) updating a data log with modification information defining any differences between content of the memory-resident plurality of data pages and content of the plurality of data pages residing in the redundant array data storage system, and 3) deferring modification of the parity page following modification of one of the plurality of data pages. The method further includes a step of re-creating content of one of the plurality of data pages or the parity page by applying the modification information in the data log to the memory-resident plurality of data pages.

The present invention further includes an article of manufacture comprising a computer usable mass storage medium having computer readable program code embodied therein, the article of manufacture being useable in a computer-implemented apparatus having a redundant array data storage system with a plurality of data pages and a corresponding parity page residing therein, the computer-implemented apparatus further including a memory-resident plurality of data pages corresponding to the plurality of data pages residing in the redundant array data storage system, the article of manufacture for updating pages in the redundant array data storage system, the computer readable program code in the article of manufacture including: 1) means for applying version information to each page of the plurality of data pages and the parity page, the version information indicating a version of content in the page, 2) means for updating a data log with modification information defining any differences between content of the memory-resident plurality of data pages and content of the plurality of data pages residing in the redundant array data storage system, and 3) means for deferring modification of the parity page following modification of one of the plurality of data pages. The computer readable program code in the article of manufacture further includes a means for re-creating content of one of the plurality of data pages or the parity page by applying the modification information in the data log to the memory-resident plurality of data pages.

DETAILED DESCRIPTION OF THE INVENTION

The present invention is a method and apparatus for using undo/redo logging to perform asynchronous updates of parity and data pages in a redundant array data storage system. In the following description, numerous specific details are set forth in order to provide a more thorough understanding of the invention. It will be apparent, however to one of ordinary skill in the art that the present invention may be practiced without these specific details. In other instances, well known features have not been described in detail in order not to unnecessarily obscure the present invention.

Figure 1:
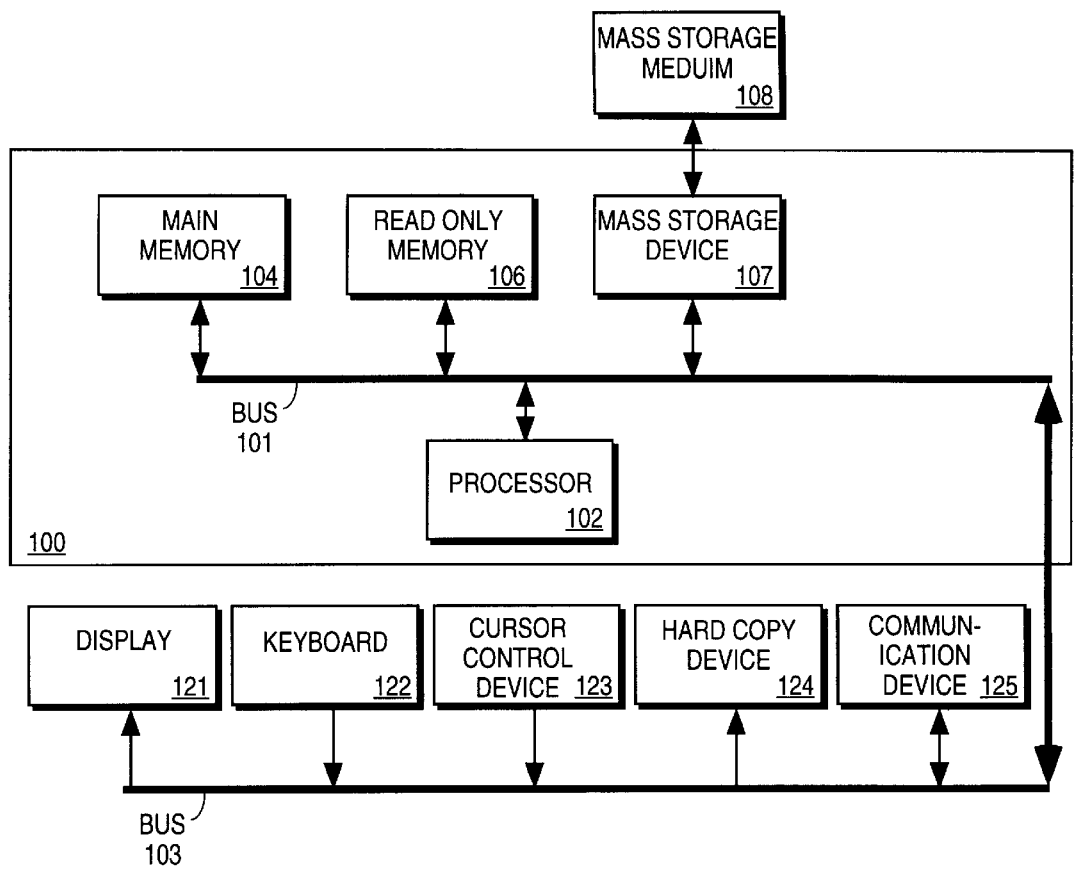
FIG. 1 is a schematic diagram of a conventional redundant array data storage system used in the prior art.

FIG. 1 illustrates a typical data processing system upon which one embodiment of the present invention is implemented. It will be apparent to those of ordinary skill in the art, however that other alternative systems of various system architectures may also be used. The data processing system illustrated in FIG. 1 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. In the preferred embodiment, a communication device 125 is coupled to bus 101 through bus 103 for use in accessing other nodes of a distributed system via a network. This communication device 125 may include any of a number of commercially available networking peripheral devices such as those used for coupling to an Ethernet, token ring, Internet, or wide area network. Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer or a Sun® SPARC Workstation. Processor 102 may be one of the 80X86 compatible microprocessors such as the 80486 or PENTIUM® brand microprocessors manufactured by INTEL® Corporation of Santa Clara, Calif.

The control logic or software implementing the present invention can be stored in main memory 104, mass storage device 107, or other storage medium locally accessible to processor 102. Other storage media may include floppy disk drives, memory cards, flash memory, or CD-ROM drives. It will be apparent to those of ordinary skill in the art that the methods and processes described herein can be implemented as software stored in main memory 104 or read only memory 106 and executed by processor 102. This control logic or software may also be resident on an article of manufacture comprising a computer readable medium 108 having computer readable program code embodied therein and being readable by the mass storage device 107 and for causing the processor 102 to coordinate accesses to a storage system in accordance with the teachings herein.

Figure 2:
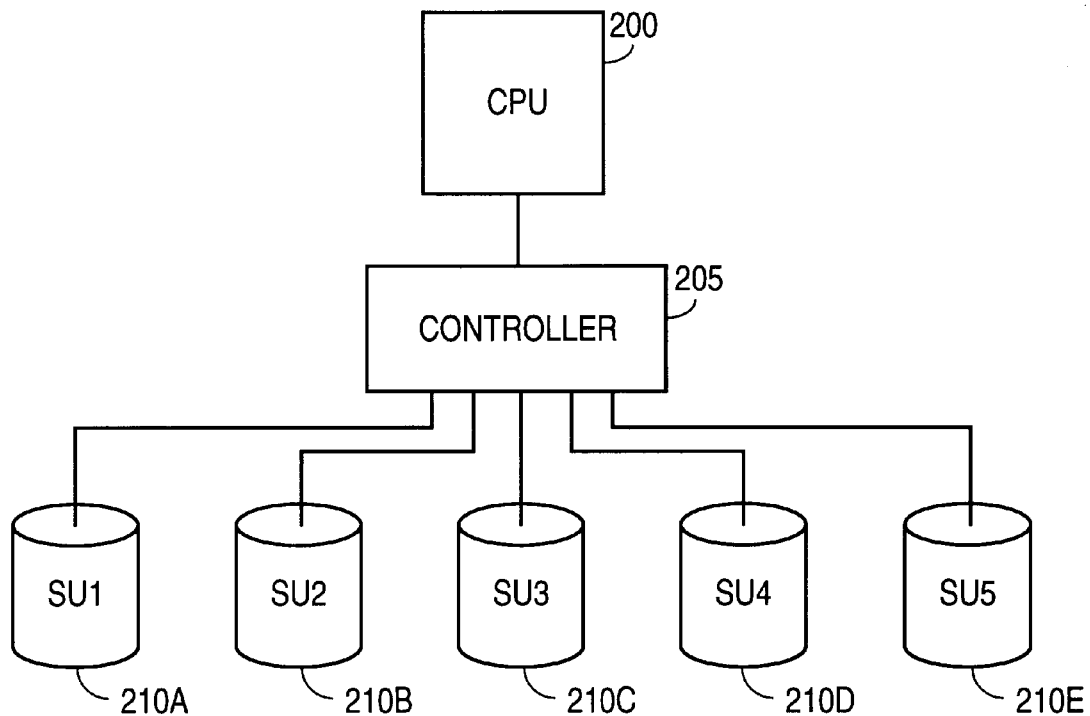
FIG. 2 is an example of a data storage system that may be used with the present invention.

FIG. 2 is an example of a data storage system that may be used with the present invention. The system shown in FIG. 2 comprises a central processing unit ("CPU") 200, a controller 205, and storage units "SU1" to "SU5", identified by numerals 210A to 210E, respectively. CPU 200 may be any data processing device that has a need to store and/or retrieve data from data storage units. Storage Units SU1 to SU5 may be any devices capable of storing and retrieving data, including solid state memories, magnetic tape drives, and magnetic, optical, and magneto-optical disk drives. Although the system shown in FIG. 2 includes five storage units, the present invention may be used with any number of storage units. Controller 205 controls the operation of storage units SU1 to SU5. Depending on the implementation, the amount of intelligence of controller 205 may vary, and controller 205 may range from a simple hard-disk drive controller to a sophisticated data processing device in its own right that performs higher level disk and data storage management functions.

Figure 3:
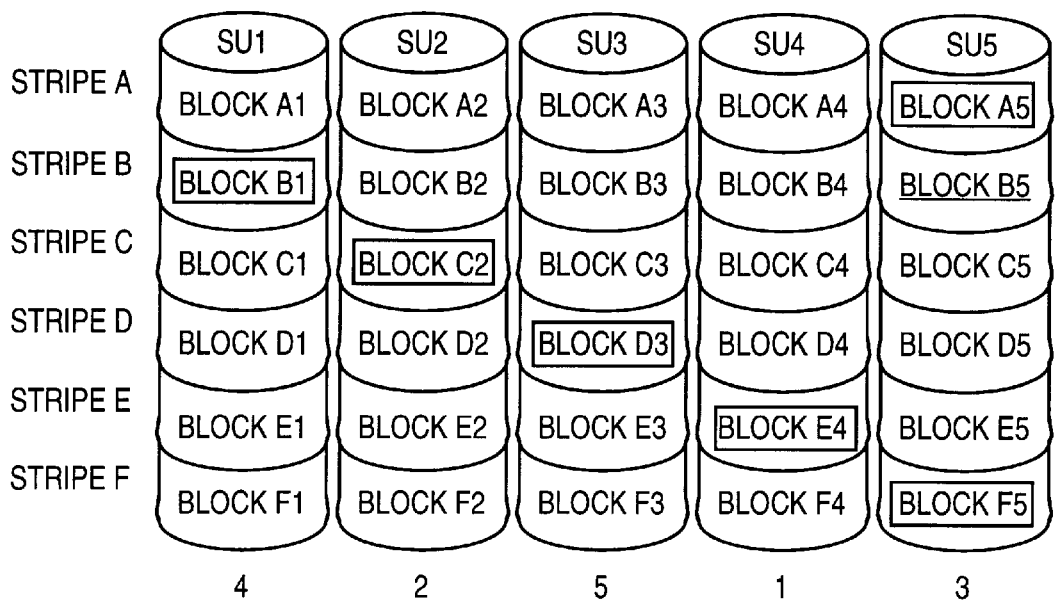
FIG. 3 is an example of a RAID-5 data storage system that may be used with the present invention.

FIG. 3 shows how the array of storage units SU1 to SU5 in FIG. 2 can be used to provide a redundant, RAID 5-type data storage system. In RAID 5 systems, data is distributed among data storage units in a "redundancy group" through the use of "block striping." A "redundancy group" is a group of similar storage units that are operated together in a manner that provides redundancy should any one storage unit within that group fail. In the example of FIG. 3, storage units SU1 to SU5 comprise a redundancy group. "Block striping" refers to a technique in which data storage units of the redundancy group are divided into "stripes" of equally sized "blocks or pages." In the example of FIG. 3, each of the storage units SU1 to SU5 is shown divided into six pages labeled "A" through "F" for each storage unit. Thus, the pages for storage unit SU1 are labeled "A1" through "F1," the pages for storage unit SU2 are labeled "A2" through "F2," the pages for storage unit SU3 are labeled "A3" through "F3," the pages for storage unit SU4 are labeled "A4" through "F4," and the pages for storage unit SU4 are labeled "A5" through "F5." Block or page sizes typically range from the size of an individual disk sector (about 512 bytes) to sizes of 64 KB and more in certain embodiments of the present invention. A storage unit typically has a capacity of tens of thousands of pages and more. For clarity, however, only six pages are shown for each storage unit in FIG. 3.

A "stripe" of pages consists of a set containing a corresponding page from each of the storage units in a redundancy group. For example, the first pages of storage units SU1 to SU5 are pages A1, A2, A3, A4 and A5, respectively. The set of pages A1, A2, A3, A4 and A5 is thus the first "stripe" of the redundancy group. This stripe is labeled "Stripe A" in FIG. 3. In a similar manner, the second stripe of the redundancy group, "Stripe B," consists of pages B1, B2, B3, B4 and B5, "Stripe C" consists of pages C1, C2, C3, C4 and C5, "Stripe D" consists of pages D1, D2, D3, D4 and D5, "Stripe E" consists of pages E1, E2, E3, E4 and E5, and "Stripe F" consists of pages F1, F2, F3, F4 and F5.

Each stripe of the redundancy group of FIG. 3 includes four data pages and one parity page of parity information. In FIG. 3, a rectangle around the label of a page indicates that the page is a parity page. For stripe "A" in FIG. 3, actual data is stored in data pages A1, A2, A3 and A4, while parity information is stored in parity page A5. The parity information stored in the parity page of a stripe in a RAID 5 system typically consists of the XORed sum of the data pages in the stripe. In the example of FIG. 2, the parity information stored in parity page A5 consists of the XORed sum of data blocks A1, A2, A3 and A4.

In a RAID 5 system, the parity information is not all stored in the same storage unit (as in RAID 4 systems) but is alternately stored on each of the storage units in a redundancy group in a generally predetermined pattern. In the example of FIG. 3, the parity information for stripes "A" and "F" is stored on storage unit SU5, for stripe "B" in storage unit SU1, for stripe "C" in storage unit SU2, for stripe "D" in storage unit SU3, and for stripe "E" in storage unit SU4. The parity page thus "precesses" around the storage units in a helical pattern.

In the prior art, RAID 5 systems are used to store on-line databases which consist of large numbers of individual records. A typical read request thus results in the retrieval of a relatively small amount of data. Data is retrieved from the data storage units one or two pages of information at a time. During a read request, the parity page of a stripe is read only if a problem has occurred in the reading of the data pages for which a read request has been made (as opposed to a write request, where the parity information for a stripe must be read, modified, and rewritten whenever the data in any of the data pages of a stripe is changed). If an attempt to read a particular data page fails, several attempts to re-read are typically made. Only when it appears that the block is irretrievably corrupted is the data in the block reconstructed by reading the parity information from the parity page for the corrupted block's stripe and XOR'ing it with the remaining data pages in the stripe. After the remaining data blocks and the parity block have been XORed together, the resulting reconstructed, originally requested data page is delivered to the requesting device.

Figure 4:
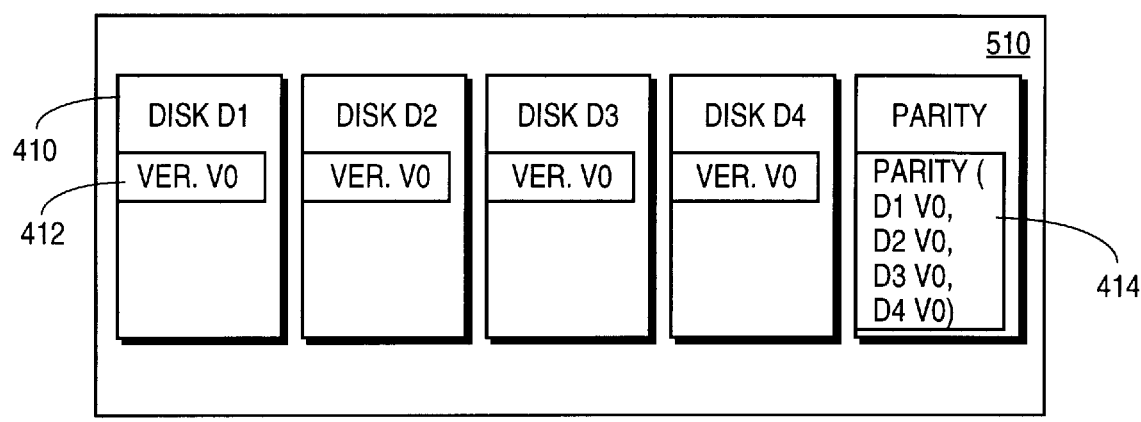
FIG. 4 illustrates a redundant array of data storage units with data pages and a parity page including version information.

Referring to FIG. 4, a simplified redundant array of data storage units (disk array) 510 is illustrated. FIG. 4 represents a single stripe of data on disk array 510. It will be apparent to those of ordinary skill in the art that many other stripes of data may be stored on the same disk array 510. The example data stripe illustrated in FIG. 4 is comprised of four data pages 410 and a parity page 414. The data pages each provide storage for a portion of the stripe. The parity page 414 provides storage for the parity information associated with the corresponding data pages 410 of that stripe.

The present invention adds information indicative of a version number 412 to each data page and the parity page of a stripe. The version number is a numerical, alphanumerical, or symbolic identifier which identifies the version of the data content of the page. For example, a version number 412 can be represented as a version number or a date on which the last modification of information in the data page was made. As a subsequent modification is made to a data page, the version number 412 is correspondingly updated to represent the newly modified data page. In this manner, the version number 412 provides coded information indicating the version of the content of the data page in which the version number 412 resides. The version number 412 is used in the preferred embodiment of the present invention to determine if a corresponding data page needs to be updated in disk array 510. Version number 412 also provides a means for determining whether or not the parity page 414 was computed from the contents of a corresponding data page.

In the example shown in FIG. 4, the four data pages 410 each carry a version number V0 representing the content of each data page as version 0. It will be apparent to one of ordinary skill in the art that each data page may carry a separate and different version number 412 as will be shown subsequently in the detailed description of the preferred embodiment. In the example of FIG. 4, the parity information stored in parity page 414 is computed from the contents of data pages D1, D2, D3, and D4. Further, the content of parity page 414 is computed based on the contents of data pages 410 when each data page was in a state corresponding to the version number 412 stored within the data page. Thus, as shown in FIG. 4, the parity information shown in parity page 414 represents the parity of data pages 410 when each data page 410 was in a state corresponding to version V0.

Figure 5:
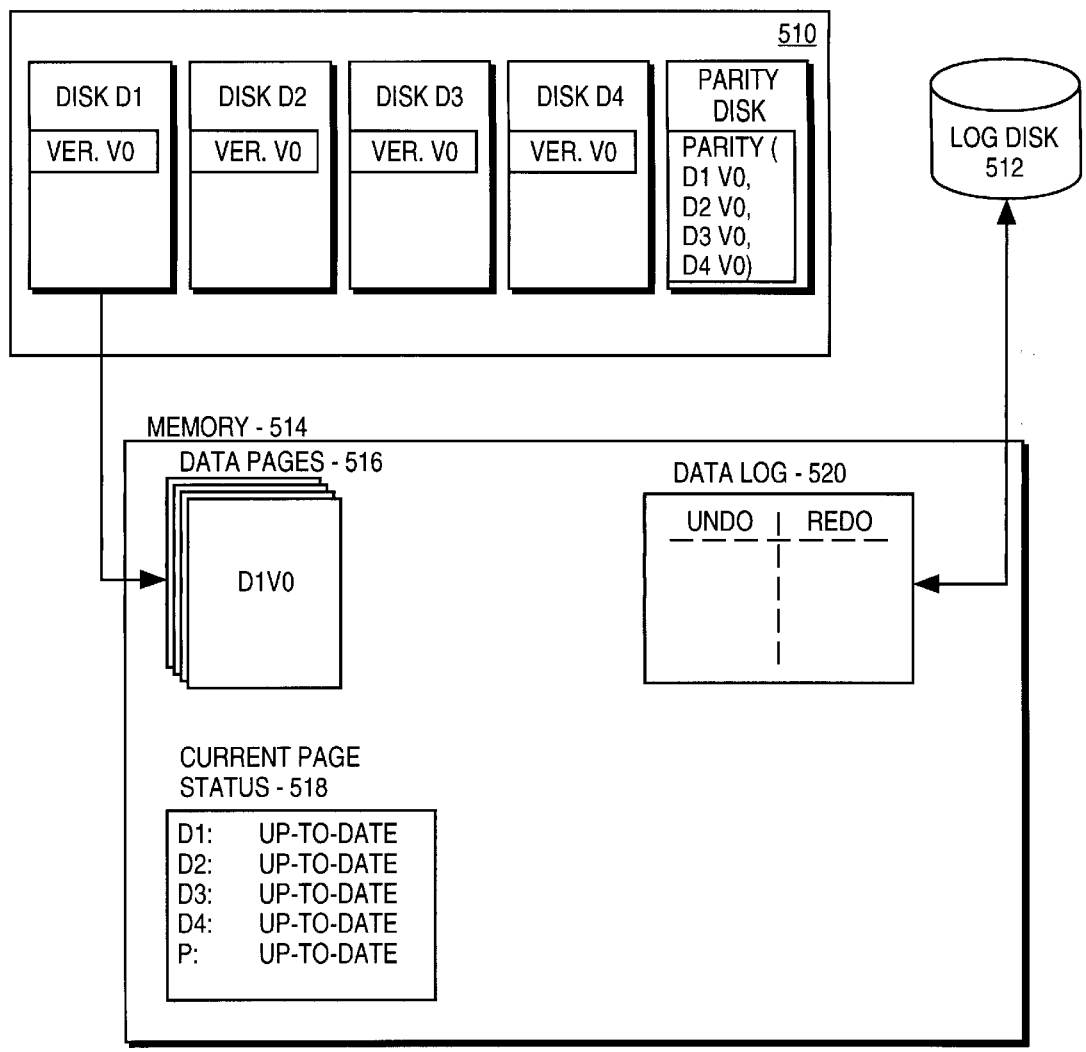
FIG. 5 illustrates a computer system with redundant data storage array in combination with a memory and a log disk.

Referring now to FIG. 5, a computer system is shown with data array 510 in combination with a memory 514 and a log disk 512. As described above, disk array 510 is shown as representing a single stripe of data comprising data pages D1 through D4 and a corresponding parity page. Memory 514 represents the volatile random access memory of a computer system such as main memory 104 shown in FIG. 1. As shown in FIG. 5, memory 514 includes a memory area for the storage of data pages 516. Data pages 516 correspond to data pages retrieved from a stripe of disk array 510. These data pages 516 may be retrieved from disk array 510 and stored using conventional means. As shown in the example of FIG. 5, a data page D1 has been retrieved from disk array 510 and stored in data pages 516. In this example, the content of data page D1 corresponds to version V0 as represented by the version number stored in the data page D1. Thus, the data page stored in data pages 516 is represented as D1V0 representing disk 1 data page at version 0. It will be apparent to one of ordinary skill in the art that the data pages D2, D3, and D4 may similarly be retrieved from disk array 510 and stored in data pages 516.

Another portion of memory 514 is used for the storage of a current page status 518. Current page status 518 contains information indicating whether the content of a data page in data pages 516 corresponds to (i.e., is consistent with) the content of the corresponding data page stored on disk array 510. If the content of the data page in data pages 516 is consistent with the corresponding data page in disk array 510, the status indication "up-to-date" is indicated for the data page in current page status 518. If the content of the data page in data pages 516 is inconsistent with the corresponding data page in disk array 510, the status "stale" is indicated for the data page in current page status 518. Similarly, a status indication for the parity page is maintained in current page status 518. The status indication "up-to-date" is indicated for the parity page if the parity page on disk array 510 corresponds to the content of the data pages stored either in data pages 516 or the data pages stored on disk array 510. Using current page status 518, it is possible to determine if a data page has been modified in memory and not yet stored back on disk array 510.

Memory 514 also includes a location for the storage of data log 520. Data log 520 is used for the storage of modification information used to advantageously eliminate the need to update the parity disk for every update of a data disk and to rebuild the data pages should they become corrupted on disk array 510. In the preferred embodiment, data log 520 is a sequential file used to record information about changes or modifications to data pages 516 that will permit the specific modification operations which took place during those changes to be repeated or undone. Data log 520 includes redo information used to describe the nature of a modification action performed on data pages 516 and providing enough information for the modification action to be redone. Data log 520 also includes undo information used for describing the nature of modification actions performed on data pages 516 and containing information permitting modification operations to be undone. The details of the redo and undo information stored in data log 520 is described in U.S. Pat. No. 5,524,205, which is assigned to Oracle Corporation.

Data log 520 is coupled to a log disk 512. Log disk 512 provides persistent storage or a non-volatile storage receptacle in which information persists when all or part of the computer system is powered down or crashes. Traditionally, this persistent storage medium includes a magnetic disk system, an optical disk, or magnetic tape system. It will be apparent to one of ordinary skill in the art that many forms of persistent storage for log disk 512 may be provided. At a predetermined time period or upon modification of data log 520, the content of data log 520 is written to log disk 512. In this manner, the contents of data log 520 may always be recreated from log disk 512 if the contents of memory 514 should be lost.

Figure 6A:
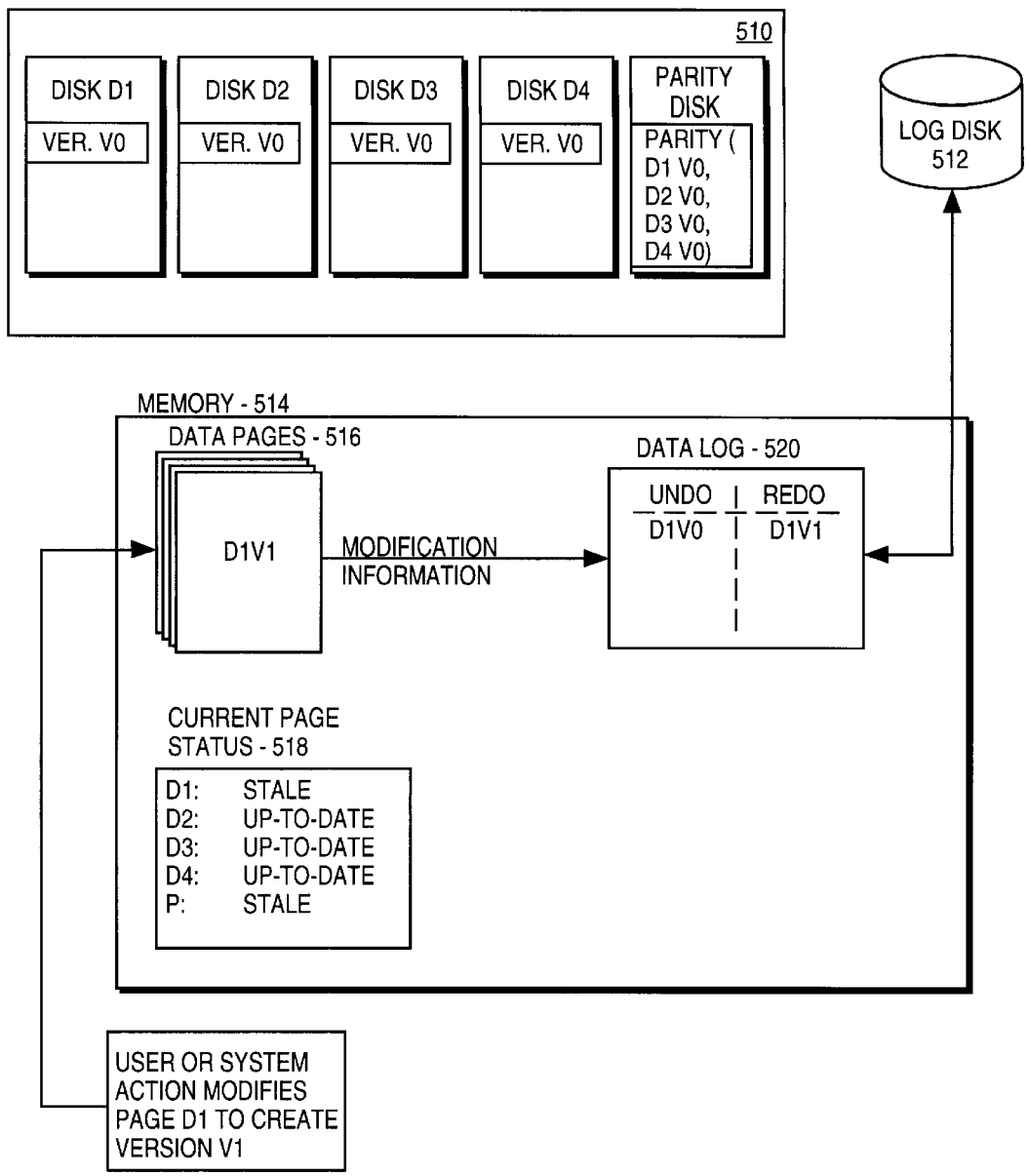
FIGS. 6A, 6B, and 7–8 illustrate the computer system after a data page is modified in memory.

Referring now to FIG. 6A, the sample system illustrated in FIG. 5 is shown after a modification is made to data page D1 of data pages 516. As shown and described previously in FIG. 5, a data page D1V0 was retrieved from disk array 510 and stored in data pages 516. The data pages 516 are shown in FIG. 6A after a modification is made to page D1. Any user action or system action may cause the modification of a page in data pages 516. In this example, data page D1V0, was modified to create data page D1V1. As a result of the modification of data page D1, current page status 518 is updated to reflect the fact that data page D1 is now stale and the corresponding parity page is also stale. Also as a result of the modification of page D1 of data pages 516, modification information is stored in data log 520. This modification information comprises undo information and redo information. The undo information corresponding to the data page modification represents information sufficient to undo the modification performed on data page D1. In this example, the undo information describes the actions necessary to undo the modification performed on data page D1 of data pages 516 thereby producing the previous version V0 of data page D1 (i.e., D1V0). The redo information stored in data log 520 represents information sufficient to redo the modification performed on data page D1 of data pages 516. In this example, the redo information represents the actions necessary to create version 1 of data page D1 (i.e., D1V1). As described earlier, once data log 520 is updated with the modification information, the content of data log 520 may be saved on log disk 512 for persistent storage. Thus, a modification to a data page of data pages 516 produces a set of undo and redo information in data log 520 and a corresponding update of page status in current page status 518.

It will be apparent to those of ordinary skill in the art that prior art systems typically require that the modified data page 516 be immediately written back to disk array 510 to maintain consistency between the content of data pages 516 and the content of disk array 510. Moreover, once a data page in disk array 510 is updated in prior art systems, the corresponding parity page on the parity disk must also be updated. Thus, prior art systems typically perform two disk array 510 accesses for every modification to a data page; one access to modify the data page and a second access to modify the corresponding parity page. As will be demonstrated in the description of the present invention set forth herein, the present invention provides a means to defer updates to the disk array 510 until it is convenient and efficient to do so. For example, because update information is maintained in data log 520, several modifications to data pages 516 may be allowed to occur before a single update access is performed to disk array 510. Further, several modifications to the data pages of disk array 510 may be allowed to occur before a corresponding update access to the parity disk or a parity page of disk array 510 is performed. As will be fully taught herein, this is a key advantage of the present invention.

Figure 6B:
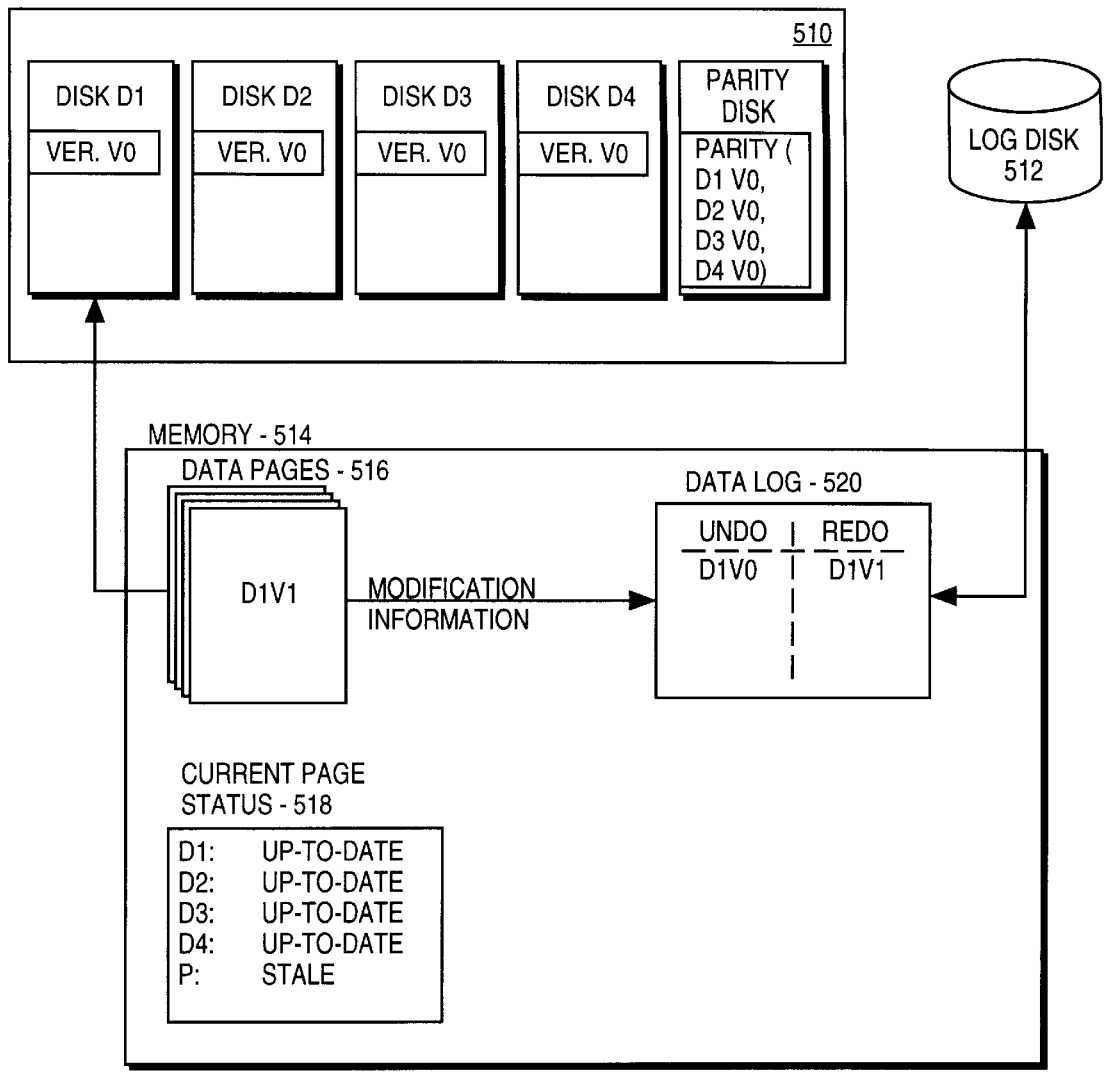

As shown in FIG. 6B, the modified data page D1V1 of data pages 516 may be written back to disk array 510. The current page status 518 is updated to indicate that disk D1 is no longer stale. Note however that the parity disk P is still stale as the parity information on disk array 510 no longer corresponds to the updated data disks of disk array 510. In the present invention, however, this inconsistency between the data pages and the parity page on disk array 510 does not create a problem. As will be described below, the parity page can be updated from the content of data pages 516 or from the modification information contained in data log 520. Thus, the update of a data page in disk array 510 does not produce an immediate second access to disk array 510 to update the corresponding parity page in the parity disk.

Figure 7:
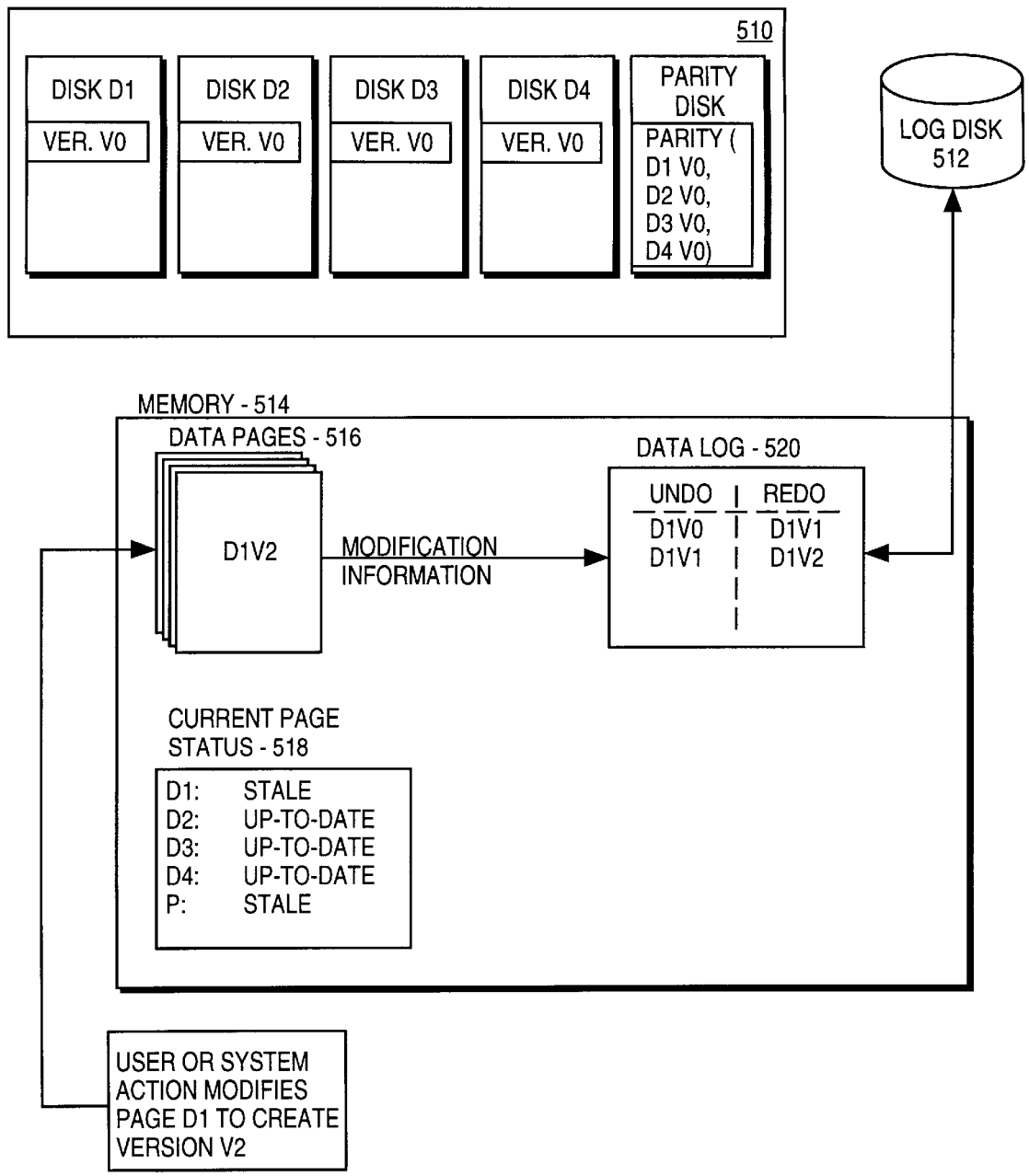

Referring now to FIG. 7, another example illustrates a further modification to data page D1 of data pages 516 after the modification shown in FIG. 6A. In this example, data page D1 is modified again to create version V2. Version V2 of data page D1 may be created again by user or system action. Again as a result of the modification of data page D1 of data pages 516, modification information is stored in data log 520. In this case, the undo information stored in data log 520 represents information sufficient to undo the modification of data page D1 thereby producing the prior version or version V1 of data page D1 (D1V1). Redo information corresponding to the modification of data page D1 is also stored in data log 520. In this case, the redo information represents information sufficient to reproduce version V2 of data page D1 (D1V2). In this same manner, any subsequent modifications of data page D1 are tracked in data log 520. As shown in FIG. 7, current page status 518 continues to show that data page D1 and the parity page are both stale.

Figure 8:
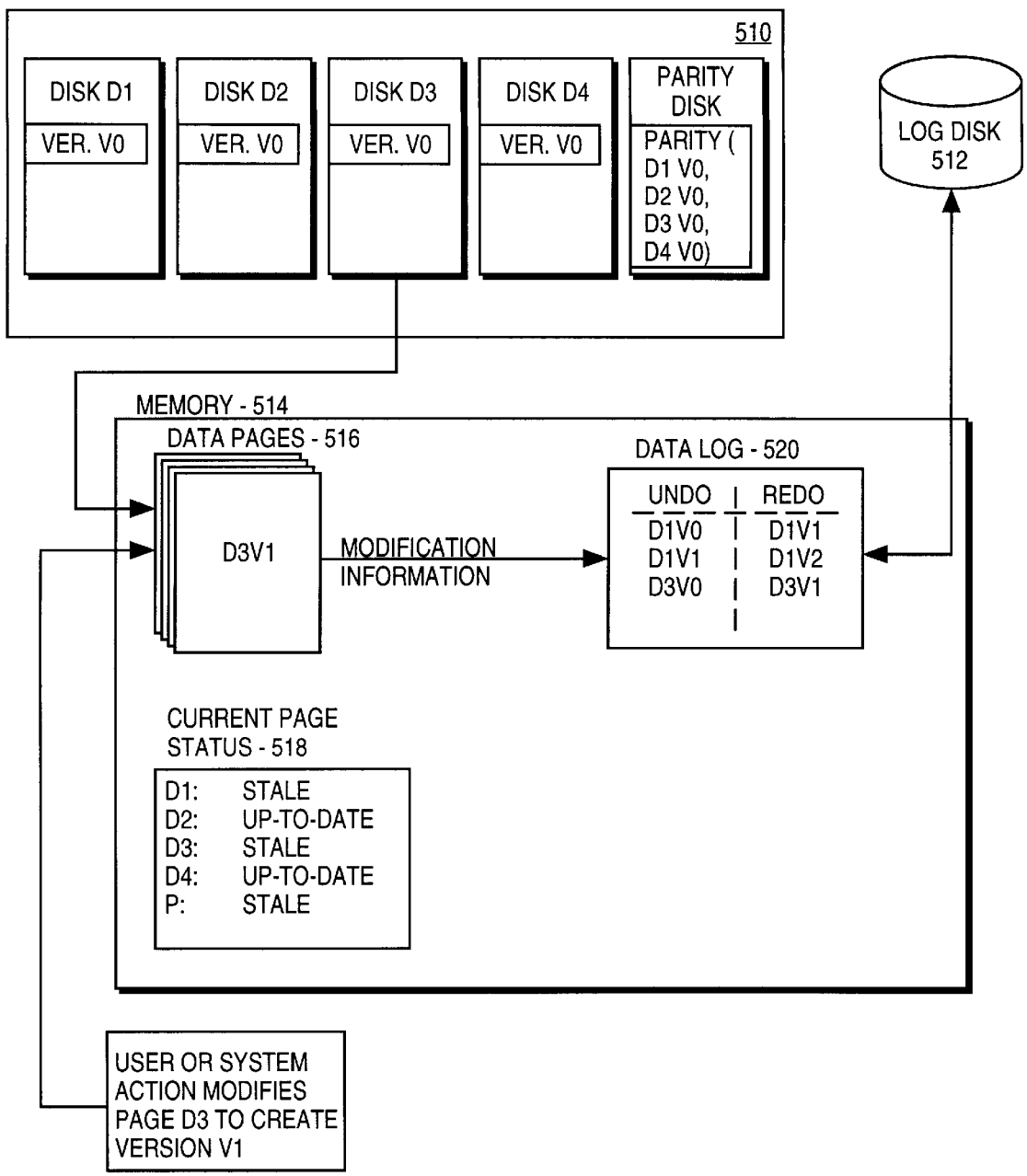

Referring now to FIG. 8, another example illustrates the modification of another data page from the stripe shown in disk array 510. In this case, the content of data page D3 at version V0 is retrieved from disk array 510 and stored in a page of data pages 516. Initially stored as D3V0, subsequent user or system action modifies page D3 to create version V1 (D3V1) as shown in FIG. 8. As a result of the modification of data page D3 of data pages 516, current page status 518 is updated to reflect that data page D3 is now stale. In addition, modification information is stored in data log 520. The modification information stored in data log 520 includes undo information sufficient to undo the modification of data page D3 to recreate version V0 of data page D3 (D3V0). In addition, redo information sufficient to redo the modification to data page D3 thereby producing version V1 (D3V1) is stored in data log 520. Again, the contents of data log 520 may then be saved in the persistent storage of log disk 512. Thus, as the example in FIG. 8 shows, any of the data pages D1 through D4 of disk array 510 may be fetched into data pages 516 of memory 514 and modified. Data log 520 and current page status 518 are updated to reflect the modification of any of data pages 516.

Figure 9:
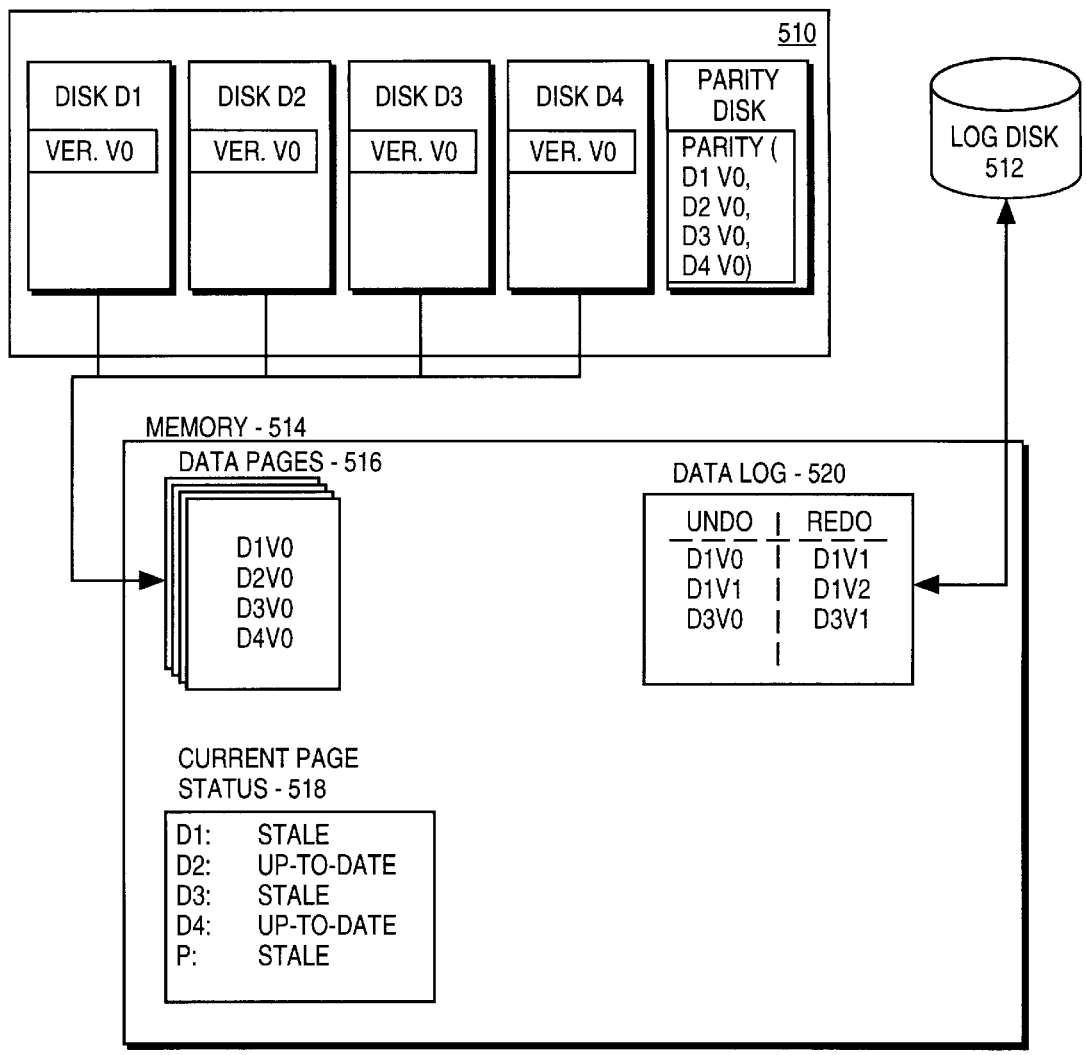
FIG. 9 illustrates the processing performed to transfer the current content of data pages from the redundant data storage array to memory.

Referring now to FIG. 9, an example illustrates the processing now possible because of the information collected in data log 520 and current page status 518 as a result of the actions performed in connection with FIGS. 6A through FIG. 8 described above. In the example of FIG. 9, the current contents of data pages 516 have been lost or not yet initialized. In fact, in an alternative example, the entire contents of memory 514 may have been lost. The contents of data log 520 can be restored from persistent storage in log disk 512. The content of current page status 518 can be rebuilt based on the content of data log 520. In an alternative embodiment, current page status 518 may not even be necessary. The current page status for each of the data pages and the parity page can be derived from the content of data log 520. However, in the example of FIG. 9, there is no persistent storage of the data pages 516 if the data pages 516 have not been written back to their corresponding places in disk array 510. In many prior art implementations, it is always necessary to write back a modified data page in memory 514 to disk array 510 in order to maintain coherency between the data page in memory 514 and the corresponding data page in disk array 510. In the present invention, however it is not necessary to maintain strict coherency between memory 514 and disk array 510. Using data log 520, the current content of data pages 516 can be recreated. This process begins as shown in FIG. 9 by loading the versions of data pages D1, D2, D3, and D4 from disk array 510 into data pages 516 of memory 514. In the example of FIG. 9, the content of these data pages correspond to version V0. By reference to current page status 518, it can be determined which pages now in data pages 516 are stale. In the example of FIG. 9, data page D1, D3, and the parity page are stale. Because these pages are stale, the current contents of these pages must be recreated from data log 520.

Figure 10:
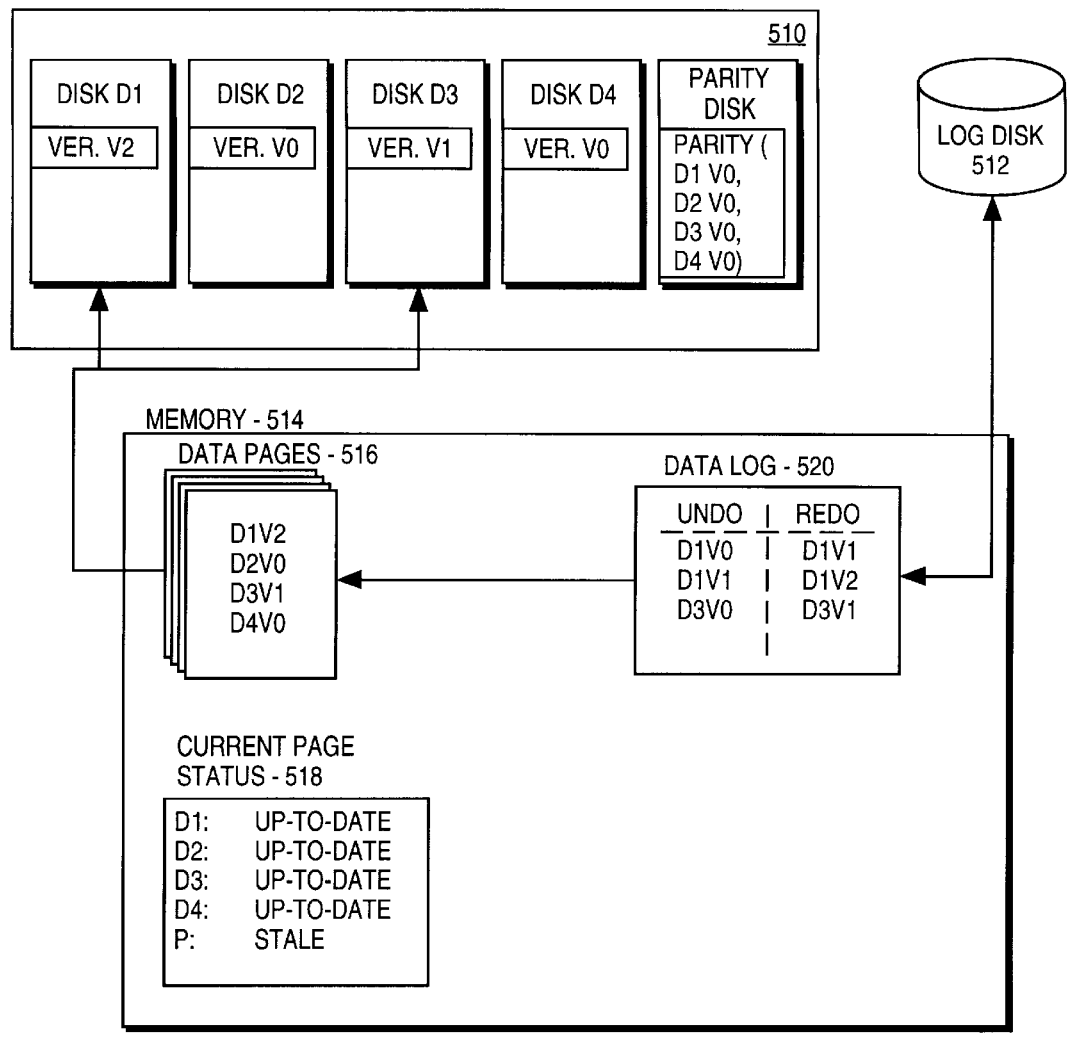
FIG. 10 illustrates how the redo information in data log is used to produce the current versions of updated data pages.

Referring now to FIG. 10, the redo information in data log 520 is used to produce the current versions of updated pages 516 from the prior versions stored on disk array 510. The current versions of data pages 516 may then be written back to disk array 510. In the example of FIG. 10, data page D1 and data page D3 have been restored in data pages 516 from the redo information residing in data log 520. Because in this example only these two pages needed to be recreated, only these two pages need to be rewritten back to corresponding data pages D1 and D3 in disk array 510. Once data pages D1 and D3 are written to disk array 510, the data page content of disk array 510 is now coherent with the data page content of data pages 516. For this reason, the current page status 518 can be updated to indicate that data pages D1, D2, D3, and D4 are now up-to-date. Similarly, the data log information in data log 520 can be cleared.

Note however that the parity page in disk array 510 no longer corresponds to the content of data pages D1, D2, D3, and D4 on disk array 510. For this reason, the parity page status in current page status 518 indicates that the parity page is stale. It is therefore necessary to rebuild the content of the parity page so it corresponds with the data pages of the same data stripe on disk array 510. This process is illustrated in FIG. 11.

Figure 11:
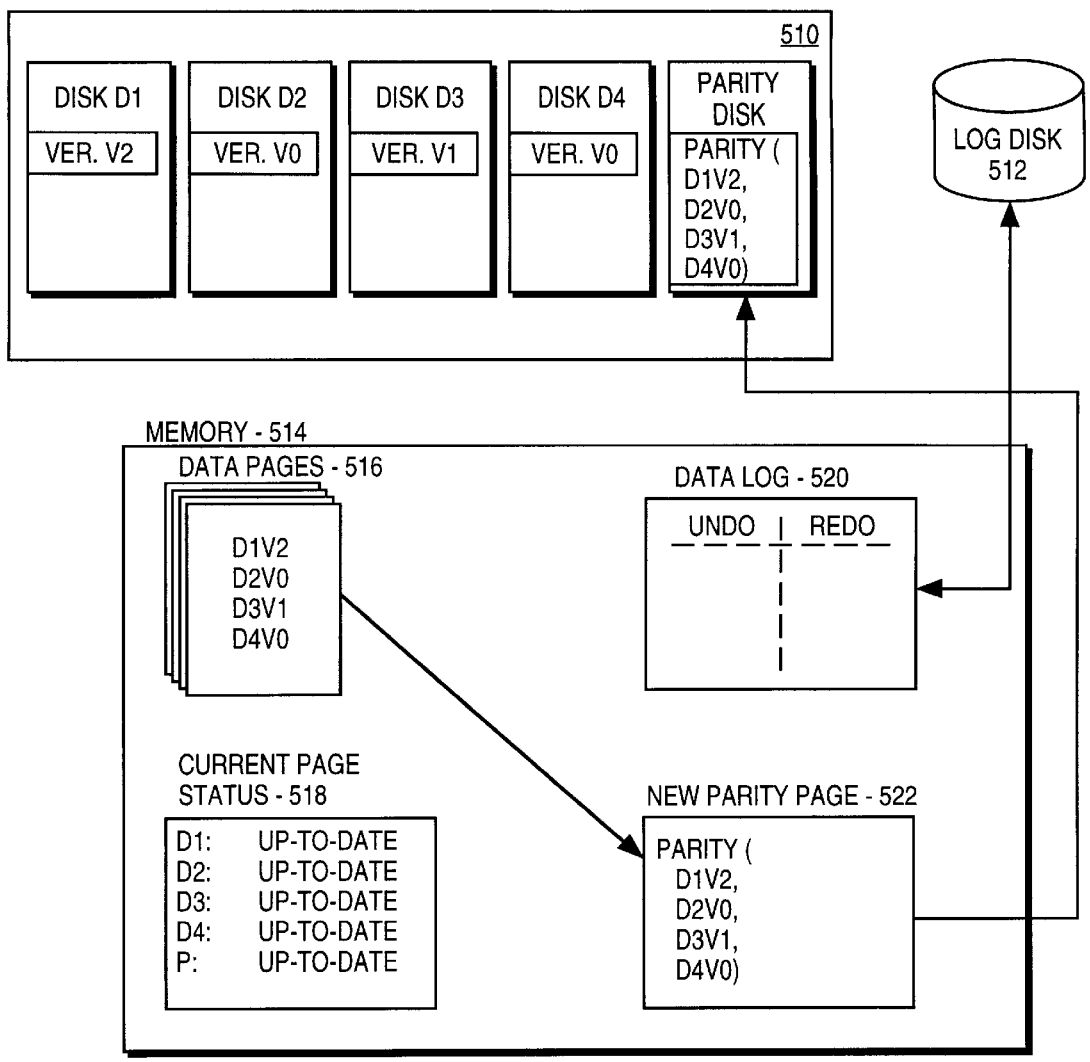
FIG. 11 illustrates the computation of the parity page.

Referring now to FIG. 11, the processing performed for rebuilding the parity page on disk array 510 is illustrated. Because the current content of the data pages 516 is now consistent with the content on disk array 510, the new parity page can be computed from the content of data pages 516. As illustrated in FIG. 11, a portion of memory 514 is used for storage of the new parity page 522 computed from data pages 516. Conventional means may be used for computing parity across each of the data pages in the stripe retained in data pages 516. The resulting parity for the stripe is then transferred from new parity page 522 storage area in memory 514 to the parity page in disk array 510. Once this transfer is complete, each of the data pages and the parity page in disk array 510 are all consistent with the content in memory 514. For this reason, the current page status 518 is updated to reflect that each data page and the parity page is now up-to-date.

The methods and apparatus of the present invention can be advantageously used in situations when one of the data storage devices of disk array 510 becomes inoperable or unreadable. Depending on which storage device of disk array 510 fails, various procedures of the present invention are used for restoring the data content on the failed storage device.

Figure 12:
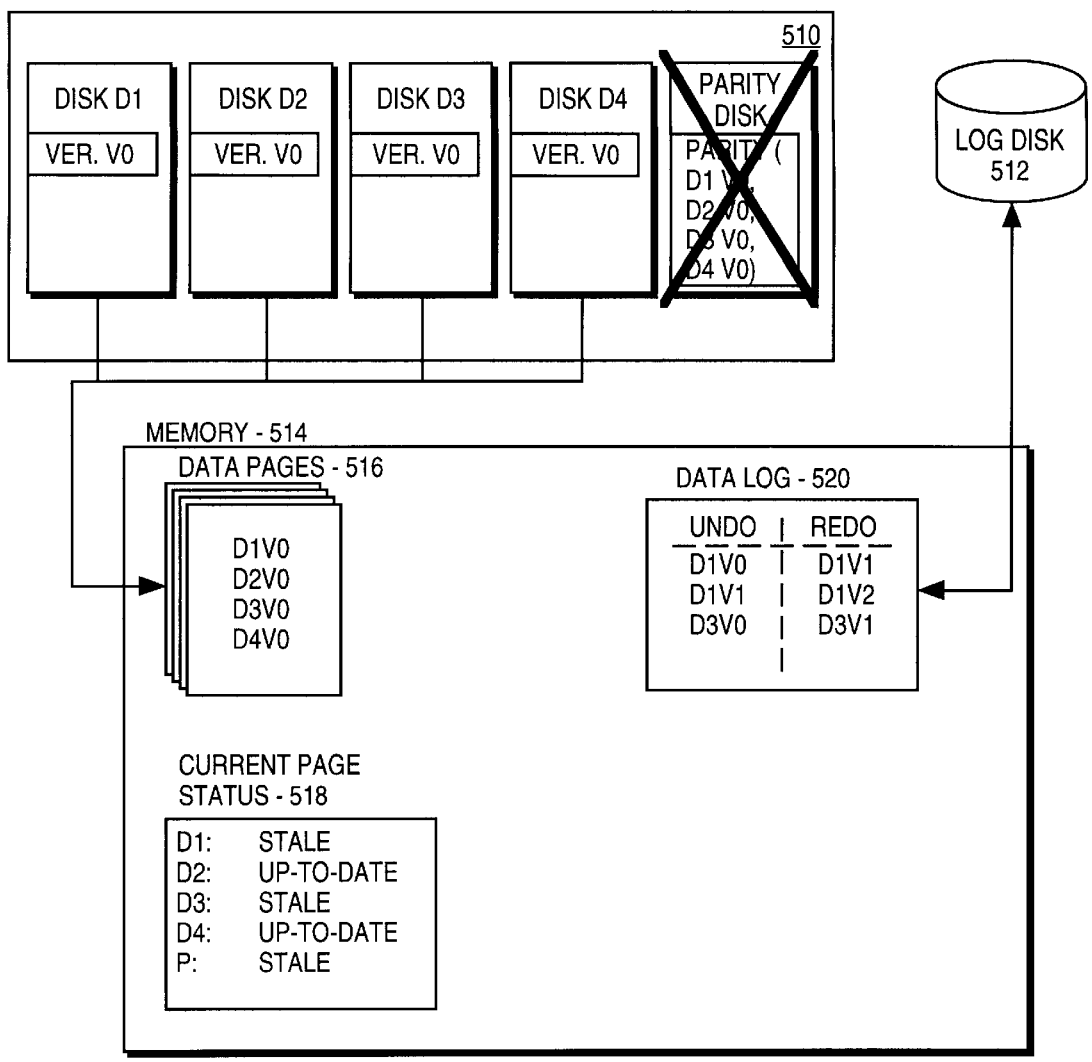
FIGS. 12–13 illustrate an example of recreating a lost parity page when one or more data pages are stale.

Referring now to FIG. 12, an example illustrates the response of the present invention to a situation where the data storage device holding the parity page in disk array 510 fails. If the content of each of the data pages in disk array 510 was consistent with the content of the data pages 516 in memory 514, restoring the parity page of disk array 510 would simply be a matter of recomputing parity from the content of data pages 516 and storing the result back to the parity page of disk array 510. However, as the example of FIG. 12 illustrates, the data pages of disk array 510 are not consistent with the content of data pages 516 in memory 514. Specifically, data page D1 and data page D3 are stale. Even though this is the case, the present invention provides a means and method for rebuilding the parity page after updating the content of data pages 516 to make them consistent with the content of the data pages in disk array 510. First, if the content of the data pages on disk array 510 do not currently reside in data pages 516, this content is transferred from disk array 510 to data pages 516 as shown in FIG. 12. Also, if necessary, the content of data log 520 can be restored from log disk 512. If there is an inconsistency between data pages 516 and the data pages in disk array 510, the content of data log 520 will define the modifications necessary to make the data pages consistent.

Figure 13:
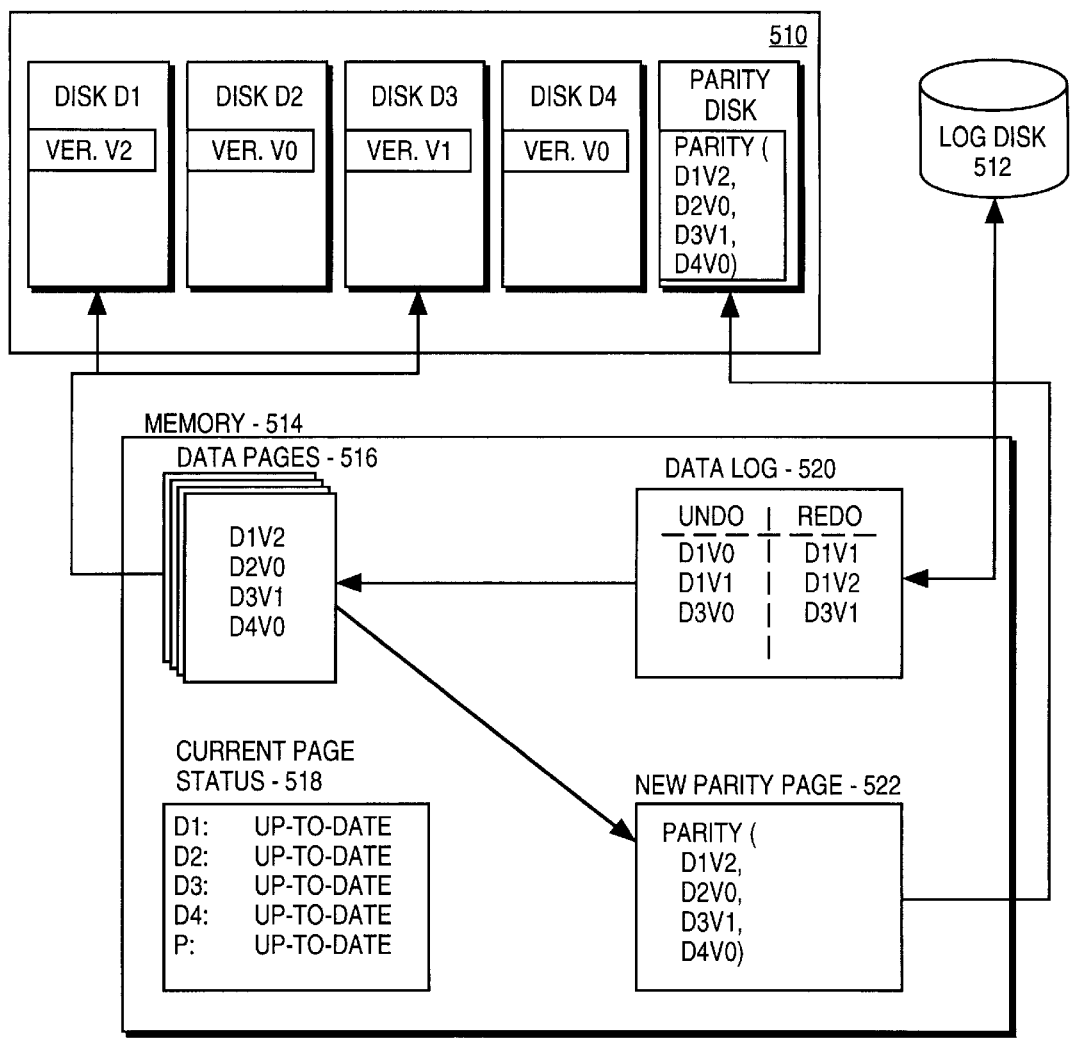

Referring now to FIG. 13, the process of making data pages 516 consistent and recomputing the parity page is illustrated. The redo log in data log 520 is used to modify the data pages 516 to make them consistent with the content of the data pages in disk array 510. In the example illustrated in FIG. 13, data page D1 is updated from version 0 to version 2 using the redo pages of data log 520. Similarly, the content of data page D3 is updated from version 0 to version 1 using data log 520. In this example, no modification was necessary to data pages D2 and D4, because these pages are consistent with those stored in disk array 510. Once the content of data pages 516 is up-to-date and consistent with data pages on the disk array 510, the corresponding status in current page status 518 is updated to reflect the fact that the data pages are now up-to-date and the parity page may be computed from data pages 516 as shown in FIG. 13. The computed parity is temporarily stored in new parity page memory area 522. Assuming the data storage device holding the parity page has been repaired or replaced in disk array 510, the new parity page may be transferred from new parity page memory area 522 to the parity page location in disk array 510. Similarly, the new content of data pages D1 and D3 may be transferred to disk array 510. Once these operations are complete, the content of the data pages and the parity page on disk array 510 are consistent with the content of data pages 516 in memory 514. For this reason, the current page status 518 reflects the fact that all pages are up-to-date and subsequently data log 520 can be cleared. It will be apparent to one of ordinary skill in the art that is not necessary to immediately transfer the content of the data pages from memory 514 back to disk array 510 or to immediately transfer the parity page from memory 514 back to disk array 510. These write back operations may be deferred for a predetermined time period or until data log 520 fills to a predetermined level.

Figure 14:
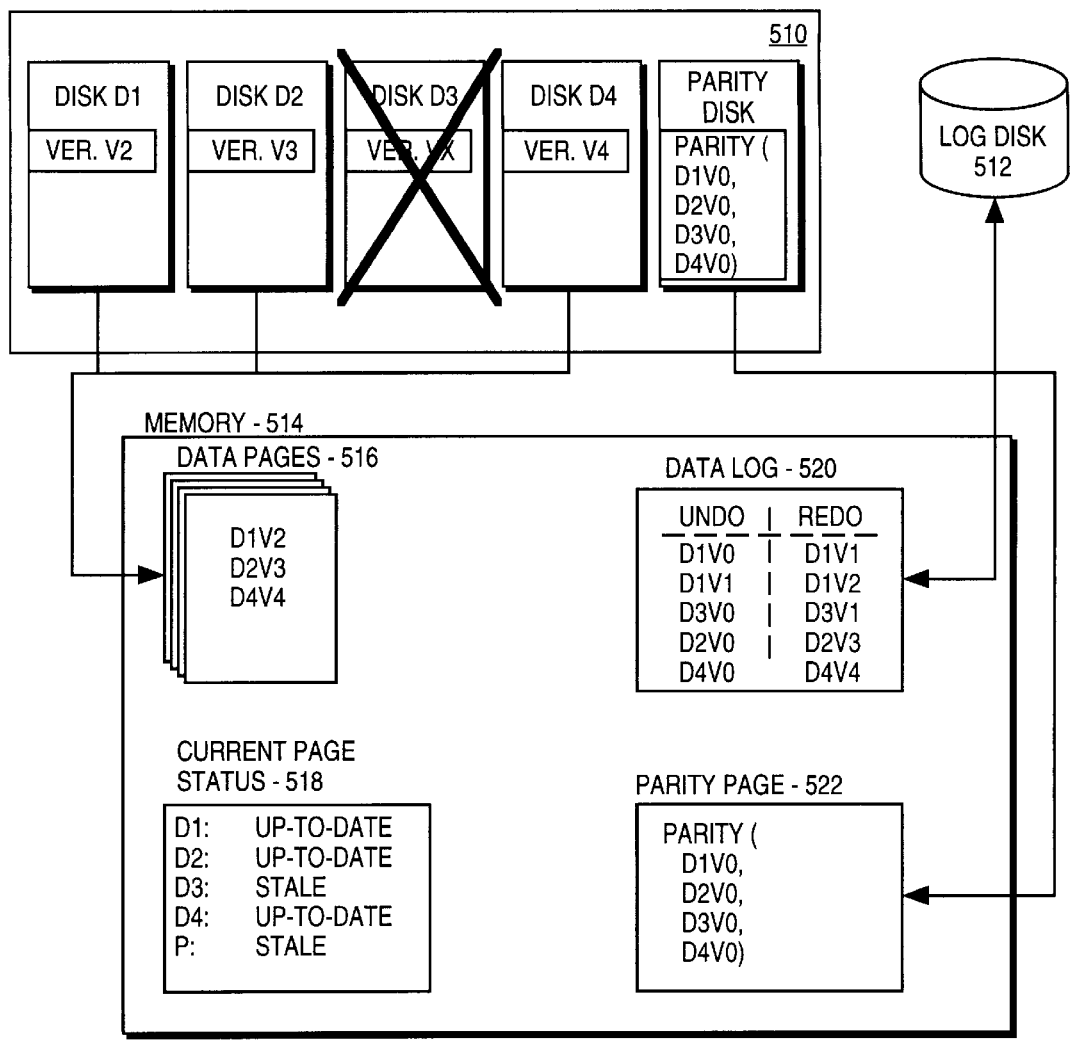
FIGS. 14–17 illustrate an example of recreating a lost data page when the parity page is stale.

Referring now to FIG. 14, another example illustrates the operation of the present invention when one of the data storage units of disk array 510 holding a data page fails. If the content of the parity page on disk array 510 was computed based on the current content of the data pages on disk array 510, restoring the failed storage device holding a data page would simply be a matter of transferring the still valid data pages and the consistent parity page from disk array 510 to memory 514 and recomputing the content of the failed data page from the other data pages in combination with the consistent parity page. However, as the example shown in FIG. 14 illustrates, the content of the parity page on disk array 510 may not be consistent with (i.e., stale) the content of the data pages in disk array 510. As shown, the parity page of disk array 510 represents the parity computed from the data pages each having a content corresponding to version 0. Currently however, data page D1 represents content at version 2, data page D2 represents content at version 3, and data page D4 represents content at version 4.

The present invention provides a means and method for making the data pages consistent with the parity page. As shown in FIG. 14, the current data pages of disk array 510 are transferred to data pages 516, if not already resident. Similarly, the content of the parity page on disk array 510 is transferred to a parity page memory area 522 in memory 514 as shown in FIG. 14. The content of data log 520 may also be transferred from log disk 512 if data log 520 is not already resident in memory 514. As shown by current page status 518, the content of the failed data page D3 and the parity page are shown as stale or inconsistent.

Figure 15:
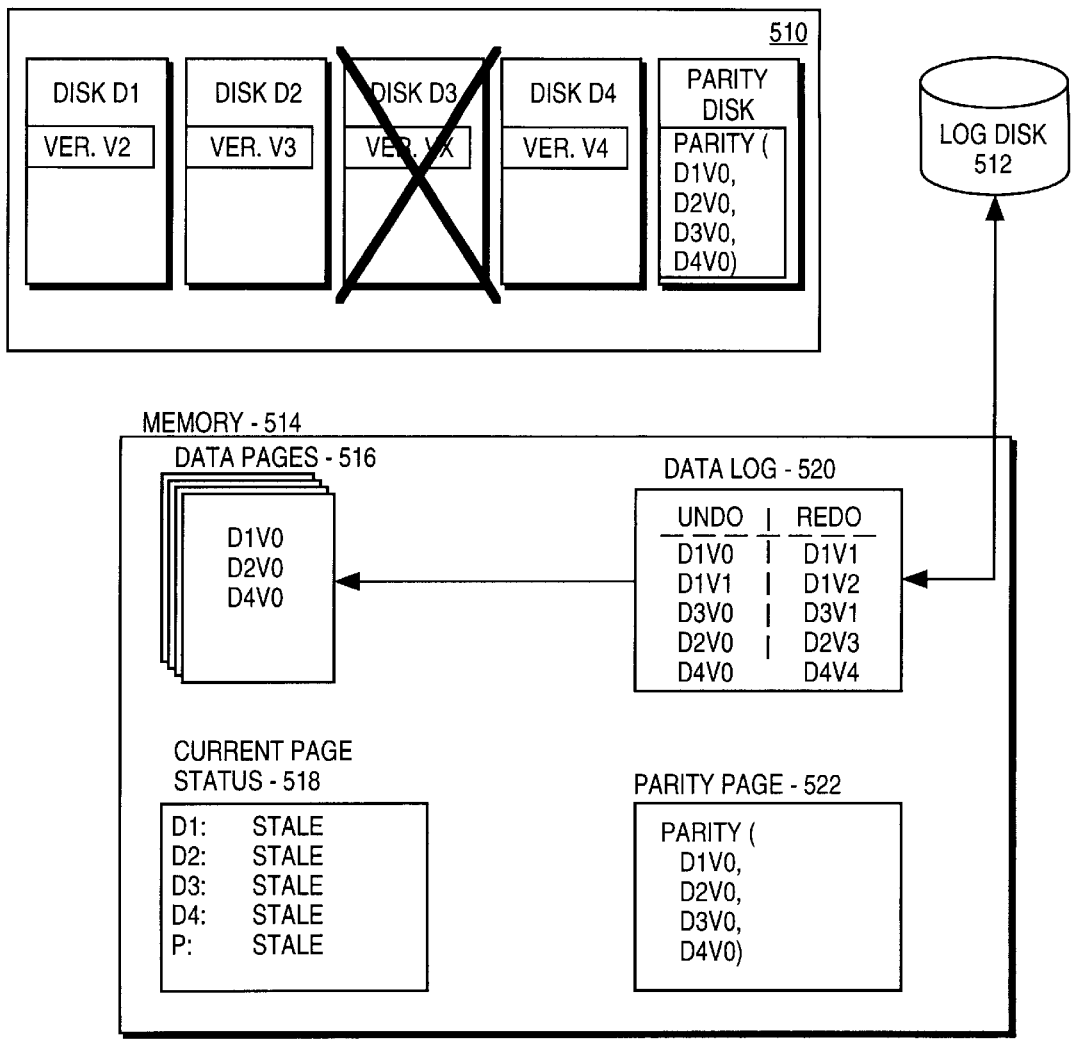

Referring now to FIG. 15, the undo log of data log 520 is used to undo or backout modifications from data pages 516 to create a version of data pages 516 that corresponds to the version of these data pages upon which parity page 522 was computed. In this example, data pages D1, D2, and D4 are reconfigured back to version 0 using the undo log of data log 520. At this point, the content of data pages 516 corresponds to the content upon which parity page 522 was computed.

Figure 16:
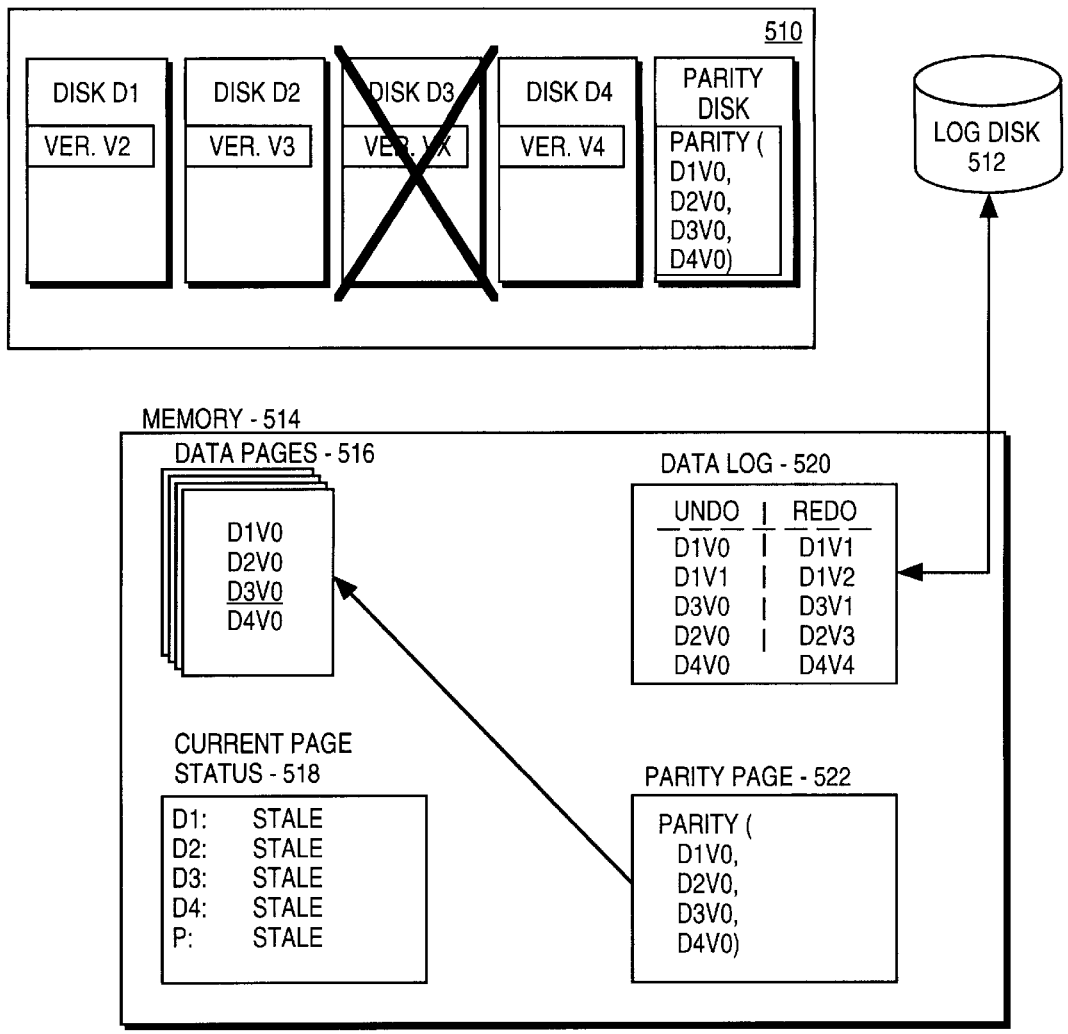

Referring now to FIG. 16, the content of data pages D1, D2, and D4 in data pages 516 in combination with parity page 522 are used to compute the content of data page D3 at version V0. Using the stale parity page 522, a version of the lost data page (data page D3 in this example) will be created that corresponds to the version upon which parity page 522 was computed. Even if the stale parity page 522 produces a stale data page in data pages 516, data log 520 can be used to produce a current and up-to-date version of the data page. This process is illustrated in FIG. 17.

Figure 17:
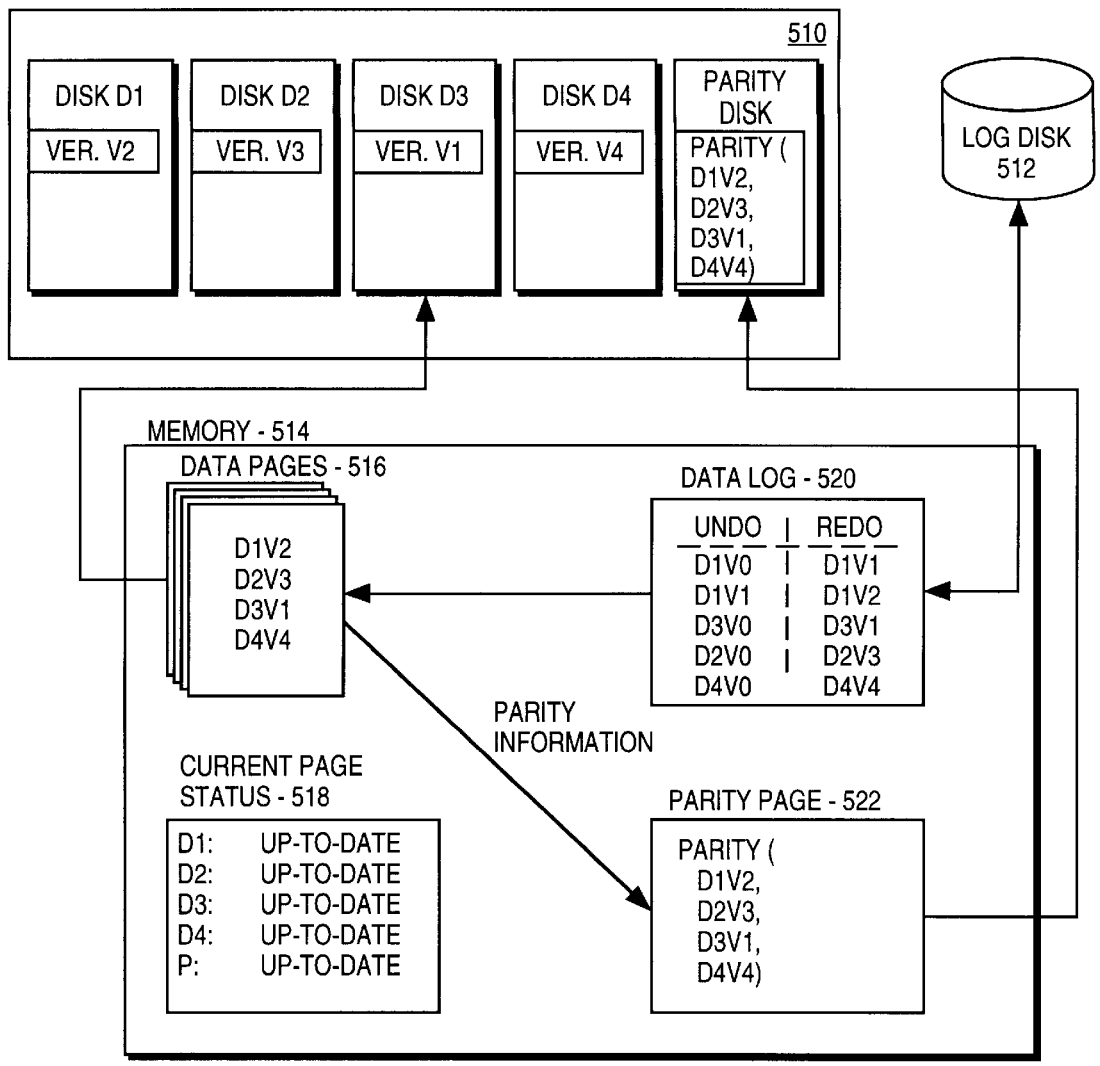

Referring now to FIG. 17, the redo log of data log 520 is used to produce current up-to-date versions of each of the data pages 516 in memory 514. Data log 520 retains all of the modification information necessary to recreate current versions of data pages 516. The current data pages may then be transferred to disk array 510. In the example of FIG. 17, data page D3 may be transferred to a now operable data storage device D3 of disk array 510. The current page status 518 can be updated to reflect that the data pages D1, D2, D3, and D4 are up-to-date. Because data pages 516 are up-to-date, the current parity page may be computed from the content of data pages 516. As shown in FIG. 17, a parity page memory area 522 of memory 514 is used for storage of the current parity corresponding to data pages 516. The current parity may then be transferred back to disk array 510 at a time convenient for the system. The status of the parity page in current page status 518 is then updated to reflect an up-to-date status for the parity page. At this point, the present invention has recreated a failed data page even though the parity page of disk array 510 was stale.

Figure 18:
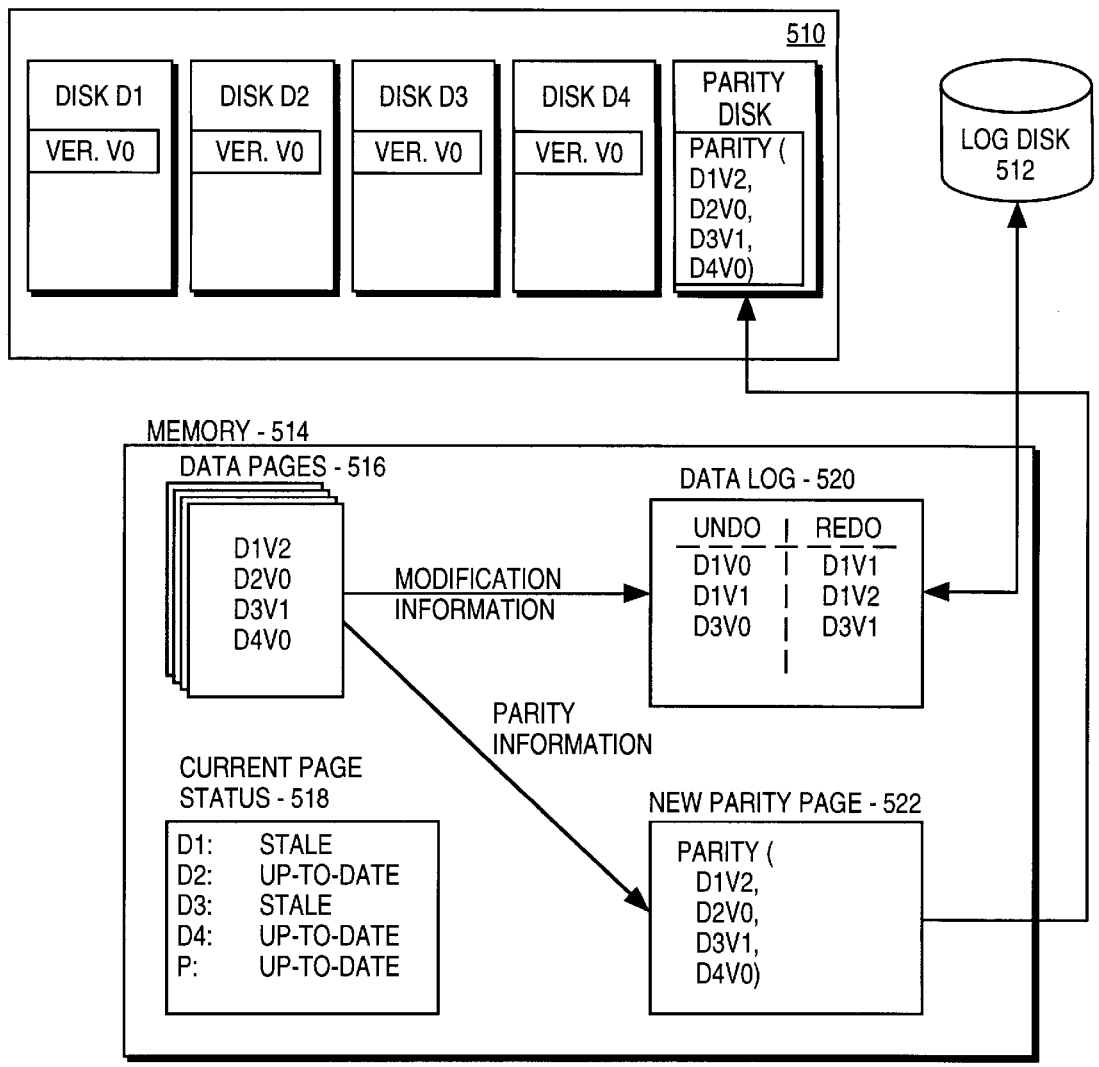
FIGS. 18–22 illustrate an example of recreating a lost data page when one or more data pages are stale.

Referring now to FIG. 18, an example illustrates a situation when the versions of the data pages on disk array 510 are older than the versions of the data pages upon which the parity page is computed. This situation may arise if a data page write back policy causes the deferral of the transfer of data pages 516 to disk array 510 to a time subsequent to the transfer of the parity page to disk array 510. In this situation, it is assumed that data pages 516 contain the current versions of the data pages. As indicated by current page status 518, data page D1 and data page D3 in data pages 516 are stale and therefore do not correspond to the versions currently residing on disk array 510. This inconsistency has been caused by a user or system modification of data pages 516. As described earlier, the modification of data pages 516 causes the transfer of modification information to data log 520 and the recomputation of new parity page 522 from the content of updated data pages 516. Pursuant to some write back policies, new parity page 522 may be written back to disk array 510 prior to the write back of the corresponding data pages.

Figure 19:
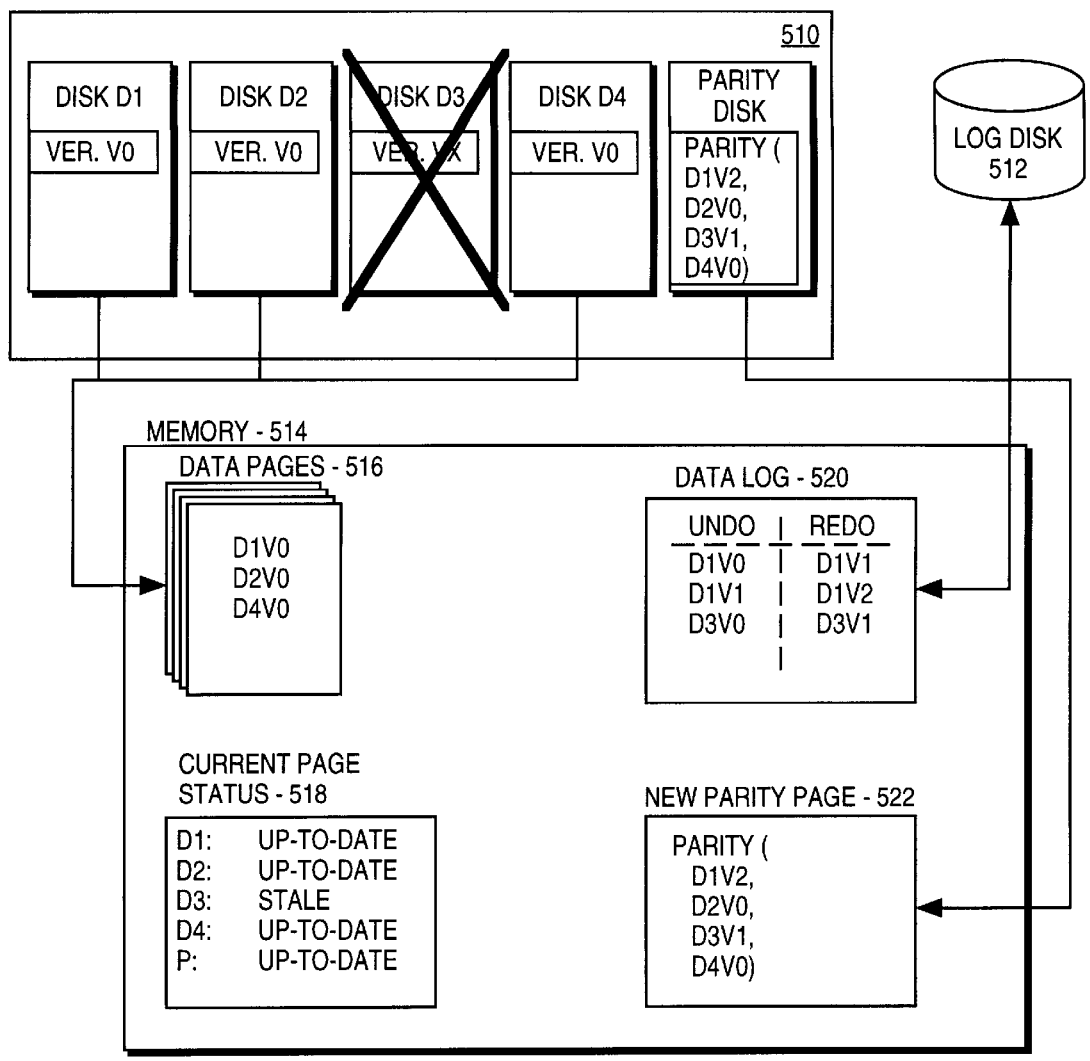

Referring now to FIG. 19, the example shown in FIG. 18 is illustrated after one of the data storage devices of disk array 510 upon which a data page resides (disk D3 in this example) has failed. In this example, the parity page of disk array 510 represents a more recent version of the data pages than the content of the data pages currently on disk array 510. In this situation, the content of the still readable data pages is transferred from disk array 510 to data pages 516. In the example of FIG. 19, data pages D1, D2, and D4 each representing version 0 are transferred to data pages 516. Similarly, the content of the parity page is transferred from disk array 510 to a new parity page memory area 522 in memory 514. As described earlier, the parity page in new parity page memory area 522 represents the parity corresponding to more recent data pages than the data pages currently in data pages 516.

Figure 20:
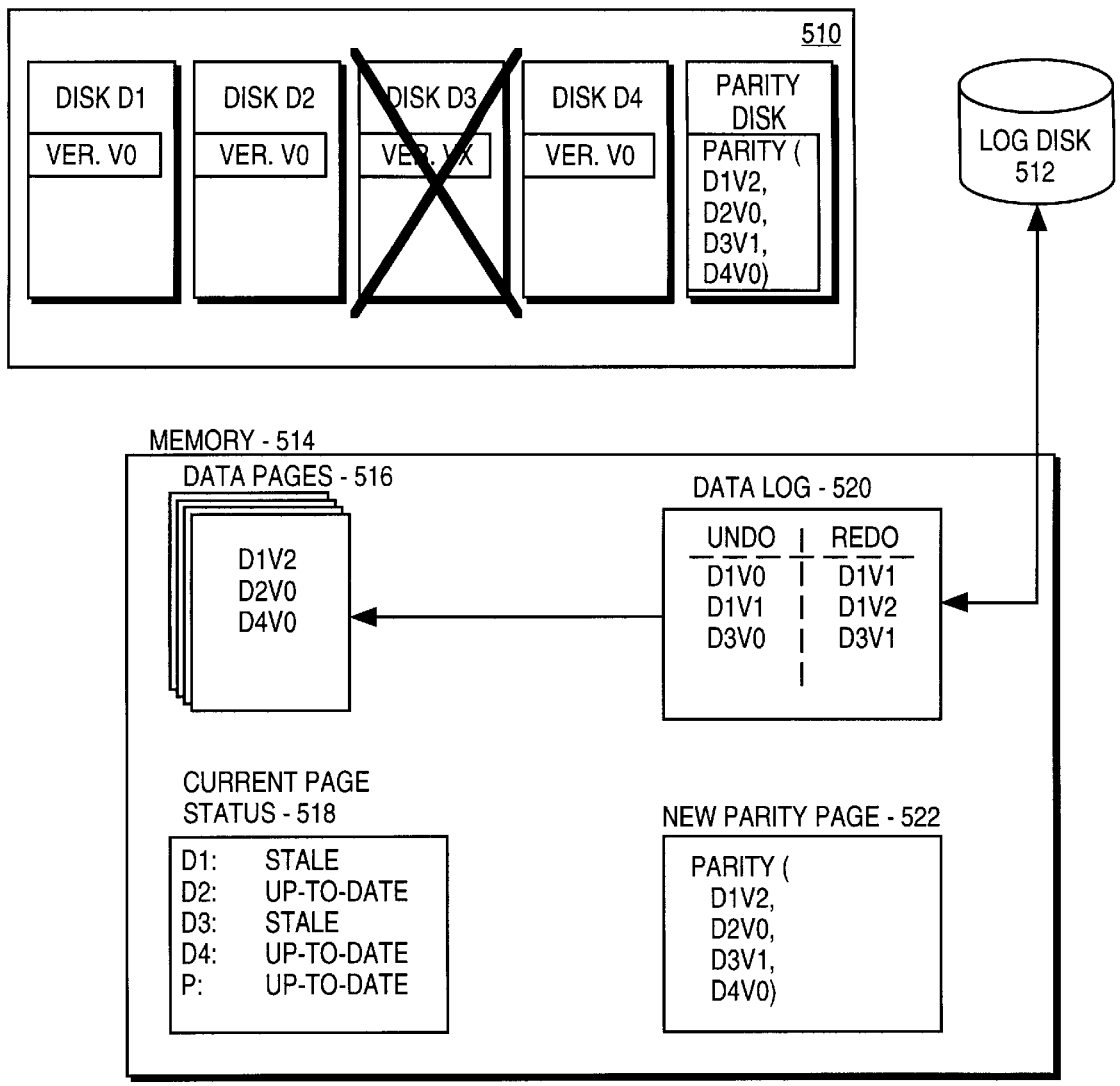

Referring now to FIG. 20, the example of FIG. 19 continues by using the redo log of data log 520 to create current versions of data pages 516 from the older versions retrieved from disk array 510. In this example, data page D1 is updated from version 0 to version 2 using the redo log of data log 520. Data pages D2 and D4 are consistent at version 0. Because data page D3 is unreadable from disk array 510, it is necessary to recreate data page D3 from the combination of the other data pages D1, D2, and D4 of data pages 516 in combination with new parity page 522. Because each of the data pages of data pages 516 have been made to correspond with new parity page 522 using data log 520, the new parity page 522 can be combined with data pages 516 to produce data page D3 version 1 as shown in FIG. 21.

Figure 21:
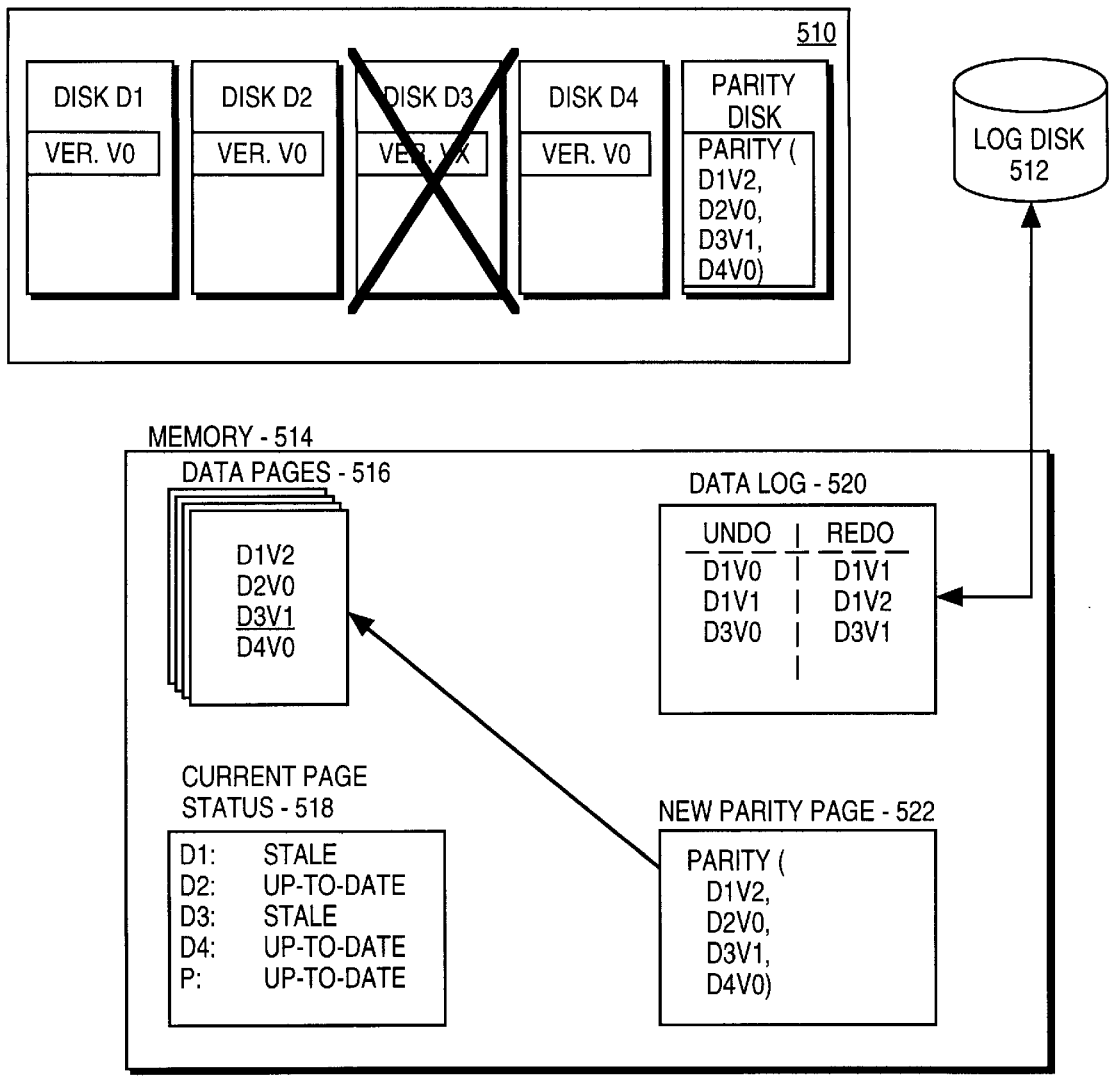
Figure 22:
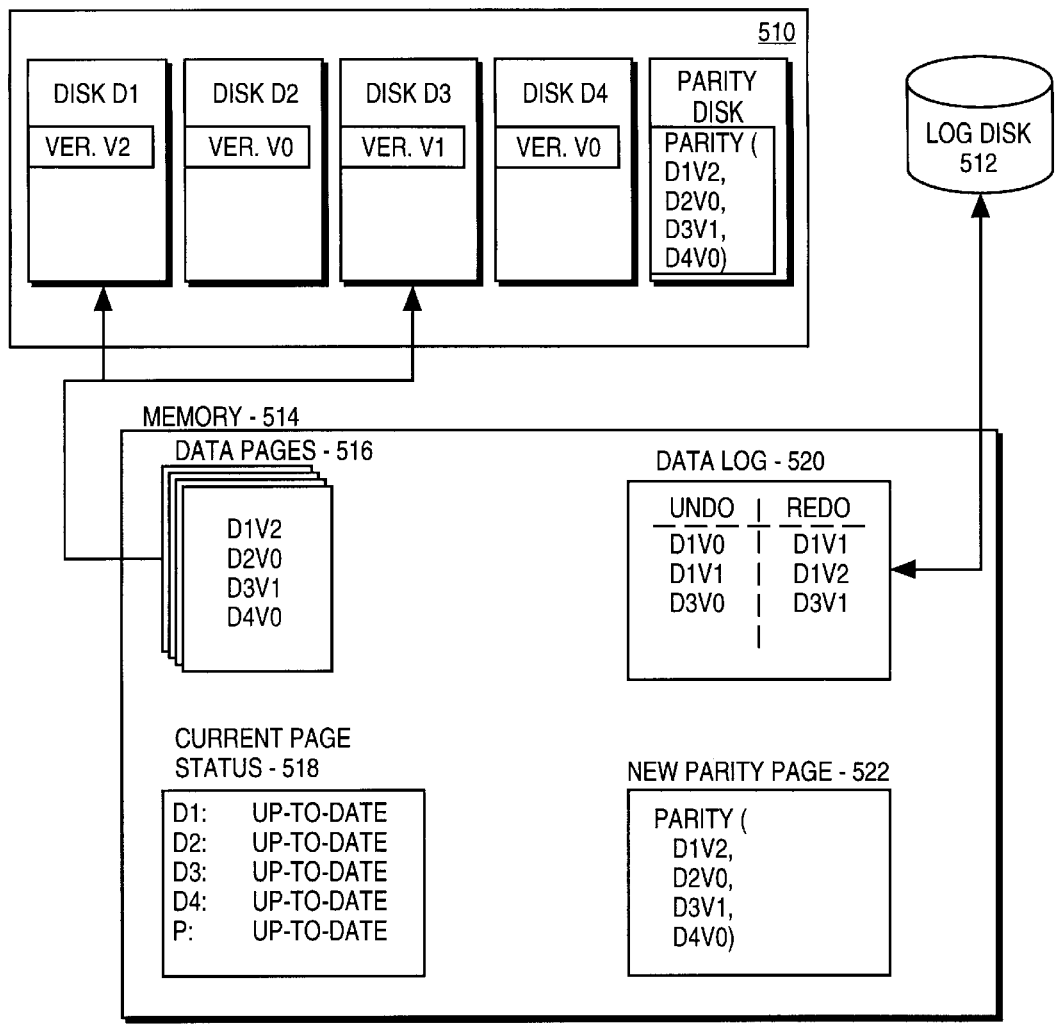

Referring now to FIG. 21, new parity page 522 has been used to create data page D3 version 1 in data pages 516. Once the data storage unit D3 of disk array 510 is repaired or replaced, the content of data page D3 version 1 can be transferred from data pages 516 to disk D3 in disk array 510 as shown in FIG. 22. Similarly, the content of updated data page D1 can optionally be transferred from data pages 516 to disk D1 of disk array 510. The current page status 518 is updated to reflect the fact that the content of the data pages and the parity page are currently consistent with the content of data pages 516.

The present invention is therefore very useful for recovering from failures in a disk array subsystem while providing increased performance through the reduced need for performing input/output (I/O) transactions with the disk array subsystem. In several scenarios, the present invention has been shown to enable recovery from a failed data storage device of a disk array subsystem even though other portions of data on the disk array subsystem are inconsistent with corresponding contents of other pages or pages in computer system memory.

Thus, a method and apparatus for using undo/redo logging to perform asynchronous updates of parity and data pages in a redundant array data storage system is described. Although the invention has been described with respect to specific examples herein, it will be apparent to those of ordinary skill in the art that the invention is not limited to the use of specific examples but may extend to other embodiments as well. The present invention is intended to include all of these other embodiments as defined in the following claims.

We claim:

1. A method of updating data in a redundant array storage system that includes a plurality of data pages and a corresponding parity page, the method comprising:

performing multiple modifications to the plurality of data pages;

deferring update of the parity page until after the multiple modifications have been performed;

updating the parity page in a single parity page update operation to bring the parity page up to date with the multiple modifications performed on the plurality of data pages, wherein updating the parity page in a single parity page update operation comprises updating the parity page based on most recent versions of each of the plurality of data pages;

retaining information in a data log for undoing the multiple modifications and for re-doing the multiple modifications;

detecting loss of one of the most recent versions of the plurality of data pages due to a system failure, the system failure occurring after one or more of the plurality of data pages in the redundant array storage system is updated to reflect the multiple modifications and before updating the parity page; and regenerating the one of the most recent versions of the plurality of data pages based on the information in the data log and a stale version of the parity page.

2. The method of claim 1 wherein updating the parity page base on most recent versions of each of the plurality of data pages comprises exclusive ORing the parity page with stale versions of each of the plurality of data pages modified in the multiple modifications and exclusive ORing the parity page with the most recent versions of each of the plurality of data pages modified in the multiple modifications.

3. The method of claim 1 wherein regenerating the one of the most recent versions of the plurality of data pages based on the information in the data log and the stale version of the parity page comprises:

undoing one or more modifications according to the information in the data log to generate one or more stale versions of the plurality of data pages;

combining the one or more stale versions of the plurality of data pages with the stale version of the parity page to generate a stale version of the lost data page; and re-doing one or more modifications according to the information in the data log to regenerate the lost data page from the stale version of the lost data page.

4. A method of updating data in a redundant array storage system that includes a plurality of data pages and a corresponding parity page, the method comprising:

performing multiple modifications to the plurality of data pages;

deferring update of the parity page until after the multiple modifications have been performed;

updating the parity page in a single parity page update operation to bring the parity page up to date with the multiple modifications performed on the plurality of data pages;

retaining information in a data log for undoing the multiple modifications and for re-doing the multiple modifications;

detecting loss of a most recent version of one of the plurality of data pages and loss of a stale version of the one of the plurality of data pages due to a system failure;

regenerating the stale version of the one of the plurality of data pages based on a stale version of the parity page; and regenerating the most recent version of the one of the plurality of data pages from the stale version of the one of the plurality of data pages and from the information in the data log for re-doing the multiple modifications.

5. The method of claim 4 wherein regenerating the stale version of the one of the plurality of data pages based on a stale version of the parity page comprises combining the stale version of the parity page with one or more stale versions of the plurality of data pages other than the lost stale version.

6. The method of claim 5 wherein combining the stale version of the parity page with one or more stale versions of the plurality of data pages other than the lost stale version comprises regenerating the one or more stale versions of the plurality of data pages other than the lost stale version from the information in the data log for undoing the multiple modifications.

7. A method of updating data in a redundant array storage system that includes a plurality of data pages and a corresponding parity page, the method comprising:

performing multiple modifications to the plurality of data pages;

deferring update of the parity page until after the multiple modifications have been performed;

updating the parity page in a single parity page update operation to bring the parity page up to date with the multiple modifications performed on the plurality of data pages;

retaining information in a data log for re-doing the multiple modifications;

detecting loss of most recent versions of the plurality of data pages generated by the multiple modifications and loss of at least one stale version of a first data page of the plurality of data pages due to a system failure, the system failure occurring after updating the parity page to an up-to-date parity page that is up to date with the multiple modifications;

regenerating each of the most recent versions of the plurality of data pages except a most recent version of the first data page based on the information in the data log for re-doing the multiple modifications; and regenerating the most recent version of the first data page by combining the up-to-date parity page with the most recent versions of the plurality of data pages regenerated based on the information in the data log.

8. The method of claim 1 wherein performing multiple modifications to the plurality of data pages comprises performing a first modification and a second modification to one of the plurality of data pages.

9. The method of claim 1 wherein performing multiple modifications to the plurality of data pages comprises performing a first modification to a first data page of the plurality of data pages and performing a second modification to a second data page of the plurality of data pages.

10. An article of manufacture including one or more computer-readable media that embody a program of instructions to update data in a redundant array storage system that includes a plurality of data pages and a corresponding parity page, wherein the program of instructions, when executed by one or more processors in a processing system, causes the one or more processors to:

perform multiple modifications to the plurality of data pages;

defer update of the parity page until after the multiple modifications have been performed; and update the parity page in a single parity page update operation to bring the parity page up to date with the multiple modifications performed on the plurality of data pages;

retain information in a data log for undoing the multiple modifications and for re-doing the multiple modifications;

detect loss of one of the most recent versions of the plurality of data pages due to a system failure, the system failure occurring after one or more of the plurality of data pages in the redundant array storage system is updated to reflect the multiple modifications and before updating the parity page; and regenerate the one of the most recent versions of the plurality of data pages based on the information in the data log and a stale version of the parity page.

11. The article of claim 10 wherein the program of instructions that causes the one or more processors to update the parity page in a single parity page update operation comprises instructions to cause the one or more processors to update the parity page based on most recent versions of each of the plurality of data pages.

12. A data processing system comprising:

a redundant array storage system that includes a plurality of data pages and a corresponding parity page; and a computer coupled to the redundant array storage system, the computer including a processing unit and a memory, the memory having stored therein a program of instructions to configure the computer to update data in the redundant array storage system, wherein the program of instructions, when executed by the processing unit of the computer, causes the computer to:

perform multiple modifications to the plurality of data pages;

defer update of the parity page until after the multiple modifications have been performed; and update the parity page in a single parity page update operation to bring the parity page up to date with the multiple modifications performed on the plurality of data pages;

retain information in a data log for undoing the multiple modifications and for re-doing the multiple modifications;

detect loss of one of the most recent versions of the plurality of data pages due to a system failure, the system failure occurring after one or more of the plurality of data pages in the redundant array storage system is updated to reflect the multiple modifications and before updating the parity page; and regenerate the one of the most recent versions of the plurality of data pages based on the information in the data log and a stale version of the parity page.

13. The article of claim 10 wherein regenerating the one of the most recent versions of the plurality of data pages based on the information in the data log and the stale version of the parity page comprises:

undoing one or more modifications according to the information in the data log to generate one or more stale versions of the plurality of data pages;

combining the one or more stale versions of the plurality of data pages with the stale version of the parity page to generate a stale version of the lost data page; and re-doing one or more modifications according to the information in the data log to regenerate the lost data page from the stale version of the lost data page.

14. The article of claim 10 wherein performing multiple modifications to the plurality of data pages comprises performing a first modification and a second modification to one of the plurality of data pages.

15. The article of claim 10 wherein performing multiple modifications to the plurality of data pages comprises performing a first modification to a first data page of the plurality of data pages and performing a second modification to a second data page of the plurality of data pages.

16. An article of manufacture including one or more computer-readable media that embody a program of instructions to update data in a redundant array storage system that includes a plurality of data pages and a corresponding parity page, wherein the program of instructions, when executed by one or more processors in a processing system, causes the one or more processors to:

perform multiple modifications to the plurality of data pages;

defer update of the parity page until after the multiple modifications have been performed;

update the parity page in a single parity page update operation to bring the parity page up to date with the multiple modifications performed on the plurality of data pages;

retain information in a data log for undoing the multiple modifications and for re-doing the multiple modifications;

detect loss of a most recent version of one of the plurality of data pages and loss of a stale version of the one of the plurality of data pages due to a system failure;

regenerate the stale version of the one of the plurality of data pages based on a stale version of the parity page; and regenerate the most recent version of the one of the plurality of data pages from the stale version of the one of the plurality of data pages and from the information in the data log for re-doing the multiple modifications.

17. The article of claim 16 wherein regenerating the stale version of the one of the plurality of data pages based on a stale version of the parity page comprises combining the stale version of the parity page with one or more stale versions of the plurality of data pages other than the lost stale version.

18. The article of claim 17 wherein combining the stale version of the parity page with one or more stale versions of the plurality of data pages other than the lost stale version comprises regenerating the one or more stale versions of the plurality of data pages other than the lost stale version from the information in the data log for undoing the multiple modifications.

19. A method of recovering data in a redundant array storage system that includes a plurality of data pages and a parity page, the method comprising:

detecting loss of a first data page of the plurality of data pages after modification of a second data page of the plurality of data pages and before the parity page is modified to reflect the modification of the second data page;

undoing the modification to the second data page to generate a previous version of the second data page that corresponds to the parity page; and recovering the first data page using the previous version of the second data page and the parity page.

20. The method of claim 19 wherein recovering the first data page using the previous version of the second data page and the parity page comprises:

generating a previous version of the first data page using the previous version of the second data page and the parity page; and redoing a modification to the previous version of the first data page to generate a more recent version of the first data page.

21. The method of claim 20 wherein redoing a modification to the previous version of the first data page to generate a more recent version of the first data page comprises redoing the modification based on modification information stored in an redo log.

22. The method of claim 19 wherein undoing the modification to the second data page to generate a previous version of the second data page comprises undoing the modification based on modification information stored in an undo log.

23. The method of claim 19 wherein recovering the first data page using the previous version of the second data page and the parity page comprises exclusive ORing the previous version of the second data page and the parity page.

24. An article of manufacture including one or more computer-readable media that embody a program of instructions to recover data in a redundant array storage system that includes a plurality of data pages and a corresponding parity page, wherein the program of instructions, when executed by one or more processors in a processing system, causes the one or more processors to:

detect loss of a first data page of the plurality of data pages after modification of a second data page of the plurality of data pages and before the parity page is modified to reflect the modification of the second data page;

undo the modification to the second data page to generate a previous version of the second data page that corresponds to the parity page; and recover the first data page using the previous version of the second data page and the parity page.

* * * * *